United States Patent
Potlapally et al.

(10) Patent No.: US 12,549,526 B2
(45) Date of Patent: *Feb. 10, 2026

(54) END-TO-END NETWORK ENCRYPTION FROM CUSTOMER ON-PREMISE NETWORK TO CUSTOMER VIRTUAL CLOUD NETWORK USING CUSTOMER-MANAGED KEYS

(71) Applicant: Oracle International Corporation, Redwood Shores, CA (US)

(72) Inventors: Nachiketh Rao Potlapally, McLean, VA (US); Pradeep Vincent, Bothell, WA (US); Jagwinder Singh Brar, Bellevue, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 18/542,247

(22) Filed: Dec. 15, 2023

(65) Prior Publication Data

US 2024/0129280 A1    Apr. 18, 2024

Related U.S. Application Data

(63) Continuation of application No. 17/133,523, filed on Dec. 23, 2020, now Pat. No. 11,848,918.

(51) Int. Cl.
*H04L 9/40* (2022.01)
*G06F 9/455* (2018.01)
(Continued)

(52) U.S. Cl.
CPC ...... *H04L 63/0428* (2013.01); *G06F 9/45541* (2013.01); *H04L 9/083* (2013.01);
(Continued)

(58) Field of Classification Search
USPC .......................................................... 713/151
See application file for complete search history.

(56) References Cited

U.S. PATENT DOCUMENTS 10,250,522 B1 * 4/2019 Anderson ........... H04L 63/0428
10,326,744 B1   6/2019 Nossik et al.
(Continued)

FOREIGN PATENT DOCUMENTS

JP    2005503047 A    1/2005
JP    2015138336 A    7/2015
(Continued)

OTHER PUBLICATIONS

"An In-Depth Look at SR-IOV NIC Passthrough", Vswitchzero, Online Available At: https://vswitchzero.com/2019/06/19/an-in-depth-look-at-sr-iov-nic-passthrough/, Jun. 19, 2019, pp. 1-13.
(Continued)

*Primary Examiner* — Sanchit K Sarker
(74) *Attorney, Agent, or Firm* — Kilpatrick Townsend & Stockton LLP

(57) ABSTRACT

For end-to-end encryption of a virtual cloud network, a VPN tunnel from a customer device is terminated at a host network headend device using encryption keys secured in hardware and managed by the customer. The network headend device can be a card in a bare-metal server with one or more network virtualization devices. The network headend device is configured to receive a first key provisioned by a customer; receive a first data packet sent from a device of the customer; and decrypt the first data packet using the first key to obtain information. A network virtualization device is configured to receive the information from the network headend device; ascertain that the information is to be sent to a virtual machine in a virtual cloud network; ascertain that data in the virtual cloud network is configured to be encrypted; and encrypt the information with a second key to
(Continued)

generate a second data packet before routing the second data packet to the virtual machine.

19 Claims, 19 Drawing Sheets

(51) Int. Cl.
*H04L 9/08* (2006.01)
*H04L 12/46* (2006.01)
(52) U.S. Cl.
CPC .......... *H04L 63/029* (2013.01); *H04L 63/164* (2013.01); *H04L 12/4641* (2013.01)

(56) References Cited

U.S. PATENT DOCUMENTS

| | | |
|---|---|---|
| 11,848,918 B2 | 12/2023 | Potlapally et al. |
| 11,856,097 B2 | 12/2023 | Potlapally et al. |
| 12,231,558 B2 | 2/2025 | Potlapally et al. |
| 2005/0013317 A1 | 1/2005 | Lindsay et al. |
| 2007/0055891 A1 | 3/2007 | Plotkin et al. |
| 2010/0115174 A1 | 5/2010 | Akyol et al. |
| 2011/0314469 A1 | 12/2011 | Qian et al. |
| 2013/0042086 A1 | 2/2013 | Cardona et al. |
| 2014/0019745 A1 | 1/2014 | Dodgson et al. |
| 2014/0269705 A1 | 9/2014 | Decusatis et al. |
| 2014/0283010 A1 | 9/2014 | Rutkowski et al. |
| 2015/0301844 A1 | 10/2015 | Droux et al. |
| 2016/0182458 A1 | 6/2016 | Shatzkamer et al. |
| 2016/0285910 A1* | 9/2016 | Galinski ................. G06F 21/62 |
| 2016/0337329 A1 | 11/2016 | Sood et al. |
| 2018/0041398 A1 | 2/2018 | Cohn et al. |
| 2019/0007378 A1 | 1/2019 | Jowett et al. |
| 2019/0044927 A1 | 2/2019 | Sood et al. |
| 2019/0081891 A1* | 3/2019 | Mundkur ................. H04L 47/39 |
| 2019/0087575 A1 | 3/2019 | Sahita et al. |
| 2019/0102323 A1 | 4/2019 | Durham et al. |
| 2019/0103972 A1 | 4/2019 | Pope et al. |
| 2020/0127981 A1* | 4/2020 | Yang ..................... H04L 63/068 |
| 2020/0279060 A1* | 9/2020 | McGraw ............. G06F 21/6209 |
| 2021/0117360 A1 | 4/2021 | Kutch et al. |
| 2022/0021678 A1 | 1/2022 | Kreger-Stickles et al. |
| 2022/0150055 A1 | 5/2022 | Cui et al. |
| 2022/0164451 A1 | 5/2022 | Bagwell |
| 2022/0276886 A1 | 9/2022 | Diaz-Cuellar et al. |

FOREIGN PATENT DOCUMENTS

| | | |
|---|---|---|
| JP | 2016511610 A | 4/2016 |
| JP | 2019205030 A | 11/2019 |
| WO | 200811 46639 A1 | 12/2008 |
| WO | 2012042637 A1 | 4/2012 |

OTHER PUBLICATIONS

"IPSEC—Internet Protocol Security", Firewall.cx, Available Online at: http://www.firewall.cx/networking-topics/protocols/127-ip-security-protocol.html, Accessed from Internet on Jan. 27, 2021, 4 pages.
"Understanding VPN Ipsec Tunnel Mode and Ipsec Transport Mode—What's the Difference?", Firewall.cx, Available Online at: http://www.firewall.cx/networking-topics/protocols/870-ipsec modes.html#:~:text=IPSec%20tunnel%20mode%20is%20the,VPN%20tunnel%20(IPSec%20peer), Accessed from Internet on Jan. 27, 2020, 3 pages.
U.S. Appl. No. 17/133,523 , "Corrected Notice of Allowability", Nov. 6, 2023, 3 pages.
U.S. Appl. No. 17/133,523 , "Non-Final Office Action", Feb. 15, 2023, 27 pages.
U.S. Appl. No. 17/133,523 , "Notice of Allowance", Aug. 8, 2023, 11 pages.
U.S. Appl. No. 17/133,526 , "Corrected Notice of Allowability", Nov. 24, 2023, 2 pages.
U.S. Appl. No. 17/133,526 , "Non-Final Office Action", Feb. 10, 2023, 21 pages.
U.S. Appl. No. 17/133,526 , "Notice of Allowance", Aug. 1, 2023, 13 pages.
U.S. Appl. No. 17/133,526 , "Supplemental Notice of Allowability", Aug. 9, 2023, 2 pages.
Deierling , "What Is a SmartNIC", Mellanox Technologies, Available Online at: https://blog.mellanox.com/2018/08/defining-smartnic/ , Accessed from Internet on Jan. 27, 2021, 3 pages.
International Application No. PCT/US2021/063714 , "International Preliminary Report on Patentability", Jul. 6, 2023, 9 pages.
International Application No. PCT/US2021/063714 , "International Search Report and Written Opinion", Apr. 11, 2022, 12 pages.
International Application No. PCT/US2021/063715 , "International Preliminary Report on Patentability", Jul. 6, 2023, 9 pages.
International Application No. PCT/US2021/063715 , "International Search Report and Written Opinion", Apr. 5, 2022, 12 pages.
U.S. Appl. No. 18/390,744, Notice of Allowance, mailed on Oct. 8, 2024, 11 pages.
Application No. EP21844123.6, Office Action, mailed on Jan. 22, 2025, 6 pages.
Application No. EP21844467.7, Office Action, mailed on Jan. 22, 2025, 7 pages.
Natarajan et al., "Security Issues in Network Virtualization for the Future Internet", 2012 International Conference on Computing, Networking and Communications (ICNC), Institute of Electrical and Electronics Engineers, Sep. 2012, 138 pages.
Application No. JP2023-538778 , Office Action, Mailed on Sep. 16, 2025, 5 pages.
Application No. JP2023-538798 , Notice of Decision to Grant, Mailed on Oct. 7, 2025, 3 pages.

* cited by examiner

END-TO-END NETWORK ENCRYPTION FROM CUSTOMER ON-PREMISE NETWORK TO CUSTOMER VIRTUAL CLOUD NETWORK USING CUSTOMER-MANAGED KEYS

CROSS-REFERENCES TO RELATED APPLICATIONS

This application is a continuation of U.S. application Ser. No. 17/133,523, filed on Dec. 23, 2020, and entitled "END-TO-END NETWORK ENCRYPTION FROM CUSTOMER ON-PREMISE NETWORK TO CUSTOMER VIRTUAL CLOUD NETWORK USING CUSTOMER-MANAGED KEYS". The following two U.S. patent applications were filed concurrently, and the entire disclosure of the other application is incorporated by reference into this application for all purposes:
application Ser. No. 17/133,526, filed Dec. 23, 2020, entitled "MECHANISM TO PROVIDE CUSTOMER VCN NETWORK ENCRYPTION USING CUSTOMER-MANAGED KEYS IN NETWORK VIRTUALIZATION DEVICE"; and
application Ser. No. 17/133,523, filed Dec. 23, 2020, entitled "END-TO-END NETWORK ENCRYPTION FROM CUSTOMER ON-PREMISE NETWORK TO CUSTOMER VIRTUAL CLOUD NETWORK USING CUSTOMER-MANAGED KEYS".

BACKGROUND

A virtual cloud network (VCN) is a customizable and private network. Similar to a traditional data center network, the VCN provides control over a network environment. This includes assigning private IP addresses, creating subnets, creating route tables, and configuring firewalls. A single tenant can have multiple VCNs, thereby providing grouping and isolation of related resources.

Data in a VCN can be encrypted for security. One purpose of encryption is to convert plaintext data into unintelligible ciphertext based on a key, in such a way that it is very hard (e.g., computationally infeasible) to convert ciphertext back into its corresponding plaintext without knowledge of the correct key. In a symmetric cryptosystem, the same key is used both for encryption and decryption of the same data. In some encryption algorithms, a key length can be 128-bit, 192-bit, or 256-bit. In some encryption standards (e.g., Data Encryption Standard (DES) algorithms, message data is encrypted with three passes of the DES algorithm. 3DES can provide a high degree of message security, but with a performance penalty. The magnitude of the performance penalty can depend on the speed of the processor performing the encryption. The RC4 algorithm, developed by RSA Data Security Inc., has become the international standard for high-speed data encryption. RC4 is a variable key-length stream cipher that operates at several times the speed of DES, making it possible to encrypt large, bulk data transfers with minimal performance consequences. Encryption of network data provides data privacy so that unauthorized parties are not able to view plaintext data as it passes over the network.

BRIEF SUMMARY

The present disclosure relates generally to a virtual cloud networks (VCN). More particularly, and without limitation, techniques are described for encrypting data between a customer and a VCN for end-to-end encryption, where the customer manages the encryption key. Instead of terminating a VPN tunnel at a VPN gateway of a host using a shared key, a VPN tunnel from a customer device is terminated at a host device using encryption keys secured in hardware and managed by the customer. The device can be a bare-metal server with a network virtualization device(s).

In certain embodiments, a system includes a network headend device and a network virtualization device. The network headend device is configured to: receive a first key provisioned by a customer; receive a first data packet sent from a device of the customer; and/or decrypt the first data packet using the first key to obtain information. The network virtualization device is configured to: receive the information from the network headend device, after the first data packet is decrypted; ascertain that the information is to be sent to a virtual machine in a virtual cloud network; ascertain that data in the virtual cloud network is configured to be encrypted; encrypt the information with a second key to generate a second data packet; and/or route the second data packet to the virtual machine.

In certain embodiments, the system is maintained by a host, and the host does not have access to the first key or the second key; the network headend device is configured to be a termination point of an internet protocol security (IPSec) tunnel formed between the network headend device and a customer device; the first data packet is routed through the public Internet; the first data packet is routed through a set of private links, without using links in the public Internet; the network virtualization device supports an instance of a virtual machine in the virtual cloud network; the network headend device is a network interface card; the network headend device is on a network interface card and the network virtualization device is part of the network interface card; the network headend device and the network virtualization device are in the same server; the network headend device is dedicated to the customer, such that no other customers of a host use the network headend device; the network virtualization device communicates with a key management service to obtain the second key; the customer provisions the first key in the network headend device using a key management service; the network headend device is a first network headend device and the system further comprises a second network headend device configured to decrypt data from the customer; the network virtualization device is a first network virtualization device, the virtual cloud network is a first virtual cloud network, the system further comprises a second network virtualization device, and/or the second network virtualization device is configured to receive data from the network headend device and encrypt data received from the network headend device for a second virtual cloud network using a third key; the first network virtualization device and the second network virtualization device are part of the same network interface card; and/or the network headend device is configured to receive the first key from the customer after a host authenticates the customer.

In yet other embodiments, a method includes receiving, using a network headend device, a first key provisioned by a customer; receiving a first data packet at the network headend device sent from a device of the customer; decrypting the first data packet, using the first key, to obtain information; receiving, using a network virtualization device, the information from the network headend device; ascertaining that the information is to be sent to a virtual machine in a virtual cloud network; encrypting the information with the network virtualization device, using a second key, to generate a second data packet; and/or routing the second data packet to the virtual machine.

The foregoing, together with other features and embodiments will become more apparent upon referring to the following specification, claims, and accompanying drawings.

Figure 1:
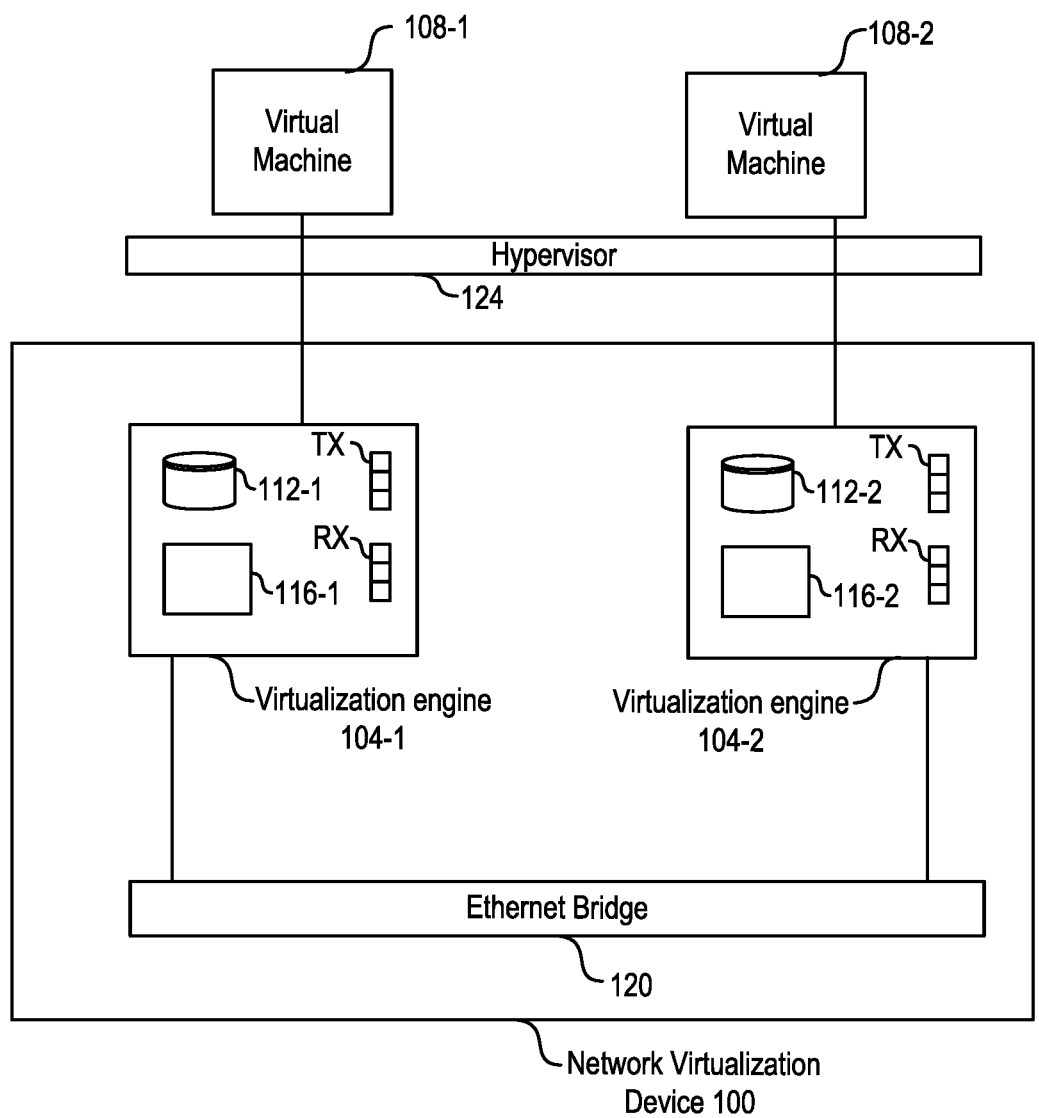
FIG. 1 depicts a schematic illustration of one embodiment of a system for a network virtualization device.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

A virtual cloud network (VCN) is a customizable and private network. A host can provide computing hardware and/or software for a customer to set up a VCN. Typically, the host manages encryption, if any, for a VCN. A customer might not want the host to manage encryption because the customer could fear a data breach of the host could compromise customer data, or the customer might be concerned about how much customer data the host has access to. This description relates to a mechanism to provide VCN network encryption using customer-managed keys. The customer-managed keys can be distributed in SmartNICs. A SmartNIC is a network interface card (e.g., a network adapter) that offloads processing tasks that a CPU might normally handle. A SmartNIC can perform functions such as encryption, decryption, routing, firewall, etc.

A SmartNIC can be used to support Network Encryption Virtual Functions (NEVFs) with a dedicated crypto accelerator and/or SRAM. The crypto accelerator can be used for in-line packet encryption. The SRAM can be used to store encryption keys. A NEVF assigned to a customer virtual machine (the customer virtual machine is part of the customer VCN) can be used for virtual machine network traffic encryption and to store encryption keys. A hypervisor can map a customer virtual machine to an NEVF. Encryption keys can be securely provisioned in the NEVFs in customer VCN instances (e.g., virtual machines (VMs) and/or bare metal (BM)).

Traffic exchanged between customer VCN instances is encrypted with encryption keys provisioned in NEVFs. Each instance in a VCN share the same encryption key (e.g., opportunistic encryption). A control plane can provision and/or manage network encryption keys for customer instances (VMs and/or BMs) in a VCN. The control plane can be used to authenticate customer virtual functions and provision encryption keys from a key management service. Using certificates, the key management service and the NIC can securely share customer encryption keys. Thus the customer can manage network encryption keys (e.g., using application program interfaces and/or operating system commands). In some configurations, unique keys are shared between VM hosts in a VCN. The NEVF of each VM host stores keys and/or meta-data associated with which key to use.

With reference to FIG. 1, a schematic illustration of one embodiment of a system for encrypting data for a virtual cloud network is shown. A network virtualization device 100 comprises a first virtualization engine 104-1 and a second virtualization engine 104-2. The virtualization engine 104 instantiates and serves a virtual network interface card (VNIC) for each bare metal or virtual machine. The virtualization engine 104 can be the Network Encrypted Virtual Functions (NEVF). The network virtualization device 100 can be a physical card (e.g., a SmartNIC)) with dedicated resources attached to it (e.g., memory and/or processors). In some embodiments, the network virtualization device 100 is a SmartTOR, a network appliance, or a service host.

Routing and/or forwarding of packets within a cloud service provider infrastructure can be performed by network virtualization devices. A network virtualization device can implement one or more virtual network functions, such as virtual network interface cards (VNIC), virtual routers, virtual network gateways, and network encryption virtual functions. network virtualization devices are virtual objects implemented using software (e.g., code or instructions executed by a processor). A network virtualization devices is a hardware component that executes a virtual function such as a virtual router (e.g., a virtual router device is a physical device that executes code implementing a virtual router). For example, a VNIC is executed by a SmartNIC; the SmartNIC is a network virtualization device. In cases where a VNIC is executed by a host machine, the host machine is a network virtualization devices. In some embodiments, the virtual router is executed by a top-of-rack (TOR) switch (and the TOR is the virtual router device). A SmartNIC is just one example of a network virtualization devices.

A virtual machine 108 is a program on a computer that performs like a separate computer inside the computer. Virtual machines can be created using virtualization software. The virtual machine 108 can execute various virtual functions.

The virtualization engine 104 comprises a memory device 112 and a crypto processor 116. Memory device 112 is configured to store a key, such as a crypto key. In some embodiments, the memory device 112 is a static random access memory (SRAM) device comprising a capacitor and a transistor.

The crypto processor 116 is configured to encrypt and/or decrypt data to and from the virtual machine 108 using the key stored in the memory device 112. A transmit packet TX is a data packet sent from the virtual machine 108. A receive packet RX is a data packet sent to the virtual machine 108. The transmit packet TX is encrypted by the crypto processor 116. The receive packet RX is decrypted by the crypto processor 116. The transmit packet TX and/or the receive packet RX are encrypted/decrypted using inline encryption/decryption. In some embodiments, the virtualization engine 104 is configured to provide network routing of data packets (e.g., the virtualization engine 104 provides routing data for the transmit packet TX).

In the embodiment shown, a virtualization engine 104 is configured to instantiate only one virtual machine 108 at a time. This allows dedicated encryption resources (e.g., the memory device 112 and/for the crypto process or 116) per virtual machine 108, which can increase security.

In the embodiment shown, the first virtualization engine 104-1 comprises a first memory device 112-1 and a first crypto processor 116-1; and the second virtualization engine 104-2 comprises a second memory device 112-2 and a second crypto processor 116-2. Accordingly, the first virtualization engine 104-1 in the second virtualization engine 104-2 are part of the same device. Though two virtualization engines 104 are shown to be part of the network virtualization device 100, it is to be understood that more than two virtualization engines 104 could be part of the network virtualization device 100 (e.g., 3, 5, 10, 100, or more virtualization engines 104 could be part of the network virtualization device 100).

In some embodiments, the network virtualization device 100 is used to implement virtual functions, such as VNIC, virtual router, and/or NEVFs. The network virtualization device 100 can be a card (e.g., a SmartNIC) in a server. Network virtualization device 100 is managed (e.g., owned and/or operated) by a host for one or more clients to set up one or more VCNs. The host is the administrator of the network virtualization device 100. A key can be stored in the memory device 112 (e.g., encrypted) so the host (e.g., administrator) does not have access to the key stored in the memory device 112. By the host not having access to the key, a client can be assured of data security, even if security of the host is compromised.

An Ethernet bridge 120 allows the first virtualization engine 104-1 to communicate via the Internet and/or to communicate with the second virtualization engine 104-2 (e.g., when the first virtual machine 108-1 and the second virtual machine 108-2 are part of the same virtual cloud network). A hypervisor 124 is used by the host to share resources of a computing system between virtual machines 108.

Figure 2:
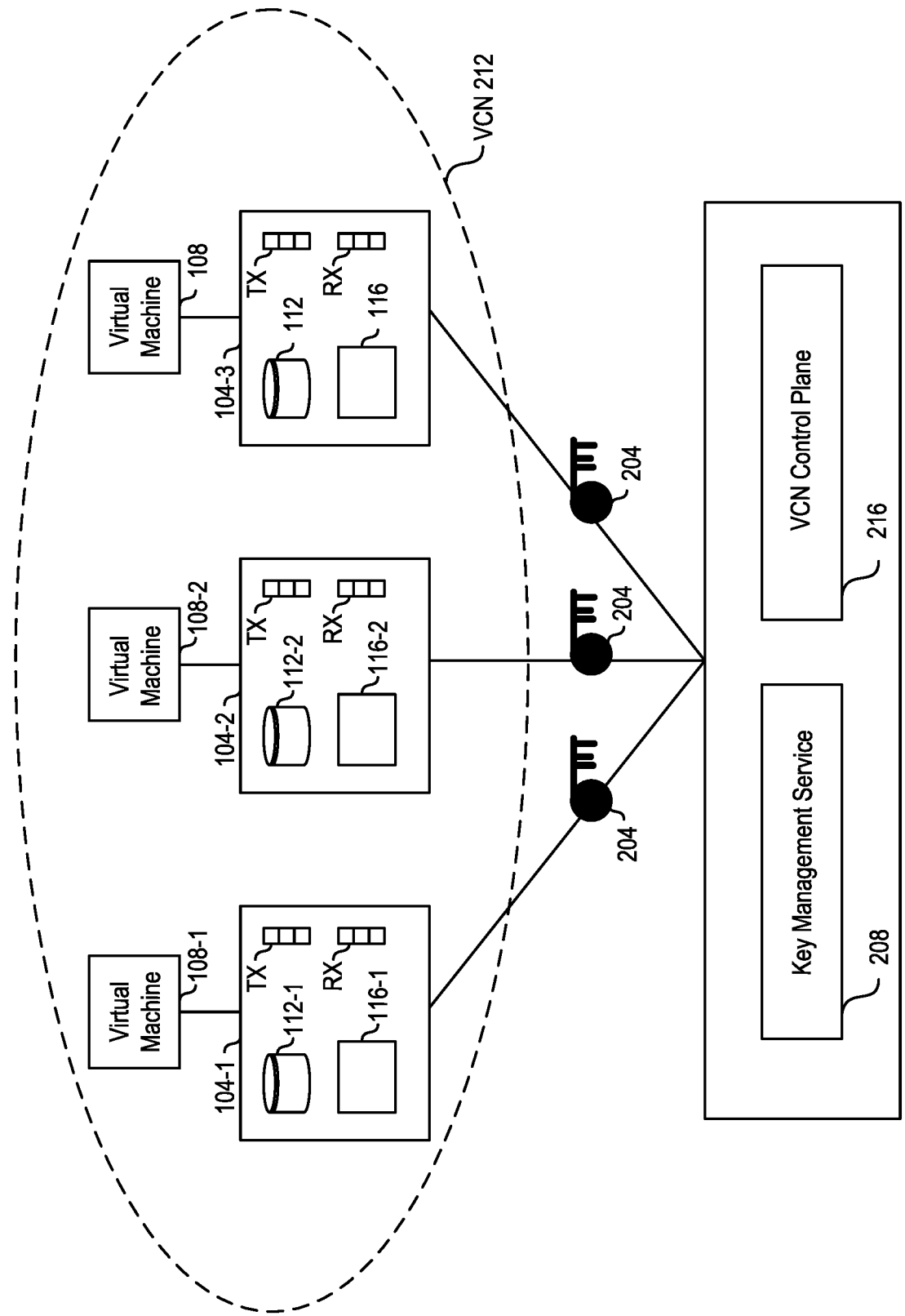
FIG. 2 is a depiction of one embodiment multiple network virtualization devices receiving crypto keys from a key management service.

FIG. 2 is a depiction of one embodiment of multiple virtualization engines 104 receiving crypto keys 204 from a key management service 208. In the embodiment shown, there are three virtualization engines 104. Though three virtualization engines 104 are shown, more or less virtualization engines 104 can be used. The virtualization engines 104 each instantiate one (and in some embodiments only one) virtual machine 108. The virtual machines 108 in FIG. 2 are part of a common virtual cloud network (VCN) 212. Since the virtualization engines 104 are part of the same VCN 212, the virtualization engines 104 each receive the same key (e.g., the same crypto key 204), which enables the virtualization engines 104 to securely communicate with each other (e.g., using the Ethernet bridge 120 shown in FIG. 1) using encrypted data. Accordingly, the first virtualization engine 104-1 is configured to receive the crypto key 204 from the key management service 208. The first virtualization engine 104-1 saves the crypto key 204 in the first memory device 112-1.

A VCN control plane 216 is configured to manage, monitor, and/or modify cloud infrastructure resources. The key management service 208 can provide the crypto key 204 to the virtualization engine 104 for a client without the host of the network virtualization device 100 having access to the crypto key 204. By the host (e.g., a cloud service provider) not having access to the crypto key 204, the client controls the security of the VCN 212.

To get a key into the memory device 112 without the host having access to the key, a customer can initialize a crypto key 204 in the key management service 208 (e.g., OCI's Cloud Key Management Service) and/or gives permission to the virtualization engine 104 to access it. In a cloud network, each resource can be assigned an identity principle (e.g., OCI's Cloud Identity Principle) whereby credentials can be given to each resource in order to authenticate a resource to other cloud resources. A virtualization engine 104 (e.g., an NEVF) is a resource and can be assigned an identity principle. The virtualization engine 104 can be authenticated to the key management service 208. The virtualization engine 104 can request the customer key (e.g., the crypto key 204).

The virtualization engine 104 can request the crypto key 204 from the key management service 208 (e.g., using the identity principle to authenticate itself to request the key). The key management system 208 can push a key (and/or updates) to the virtualization engine 104 (e.g., after authenticating the virtualization engine (104). Requesting or pushing keys is done without the host of the cloud network provisioning the key to the virtualization engine 104 (e.g., into SRAM of the virtualization engine 104). A security protocol can be pre-shared between the key management system 208 and virtualization engine 104 so that the key management system can route data to the virtualization engine 104 with a pre-shared secret to initialize the key in memory of the virtualization engine 104.

The same crypto key 204 is distributed to each virtualization engine 104 supporting a virtual machine 108 in the virtual cloud network 212. The crypto key 204 can be distributed to the virtual engine 104 when the virtual machine 108 is instantiated. For example, a customer can be asked if the VCN 212 is to be encrypted when the customer creates the VCN 212 (e.g., the customer can check a box for encryption of the VCN 212). When an instance of a virtual machine 108 is launched, an underlying protocol goes from the key management service 208 to the virtual engine 104 to distribute the crypto key 204 to the memory device 112 of the virtual engine 104. Crypto keys 204 can be updated periodically (e.g., hourly, daily, weekly, etc.) and/or updated by the customer (e.g., customer selects or defines an update schedule and/or selects to update the crypto key 204 immediately). In some embodiments, the customer generates multiple keys and, when it is time to rotate to a new key (e.g., every day at time T), the crypto key 204 is updated (e.g., each virtual engine 104 reaches out to the key management service 208 at time T). The new key is published in the memory device 112. Key synchronization (e.g., auto synchronization) can be used for multiple hosts (e.g., a synchronization counter for each virtualization engine 104 could be used to publish a new key in the memory device 112). In some embodiments, the crypto key 204 is rotated on each virtualization engine 104 based on some encryption scheme (e.g., the crypto key 204 is refreshed). Thus the crypto key 204 can be pushed and/or refreshed concurrently to or on each virtualization engine 104 that is part of the VCN 212. The key management service 208 can have a single encryption relationship with the VCN 212, so the key management service 208 does not have to maintain relationships with different devices.

By encrypting data, wherein the customer controls the keys, customers can be assured data is encrypted on a host's wires. In some embodiments, customers can communicate with a host using a transport layer security (TLS) tunnel. However, TLS has bugs and can have security problems. By allowing customers to control keys using the key management service 208, bugs and security problems of TLS can be avoided or decreased. In some embodiments, a TLS tunnel or a custom security protocol based on pre-shared keys can be used for secure communication between an NEVF and a key management service.

Though the description shows crypto keys 204 being distributed and managed at the VCN 212 level, similar processes and techniques can be used at other levels, such as at a subnet level. For example, encryption keys can be used at L2 or L3 of a VCN 212.

Figure 3:
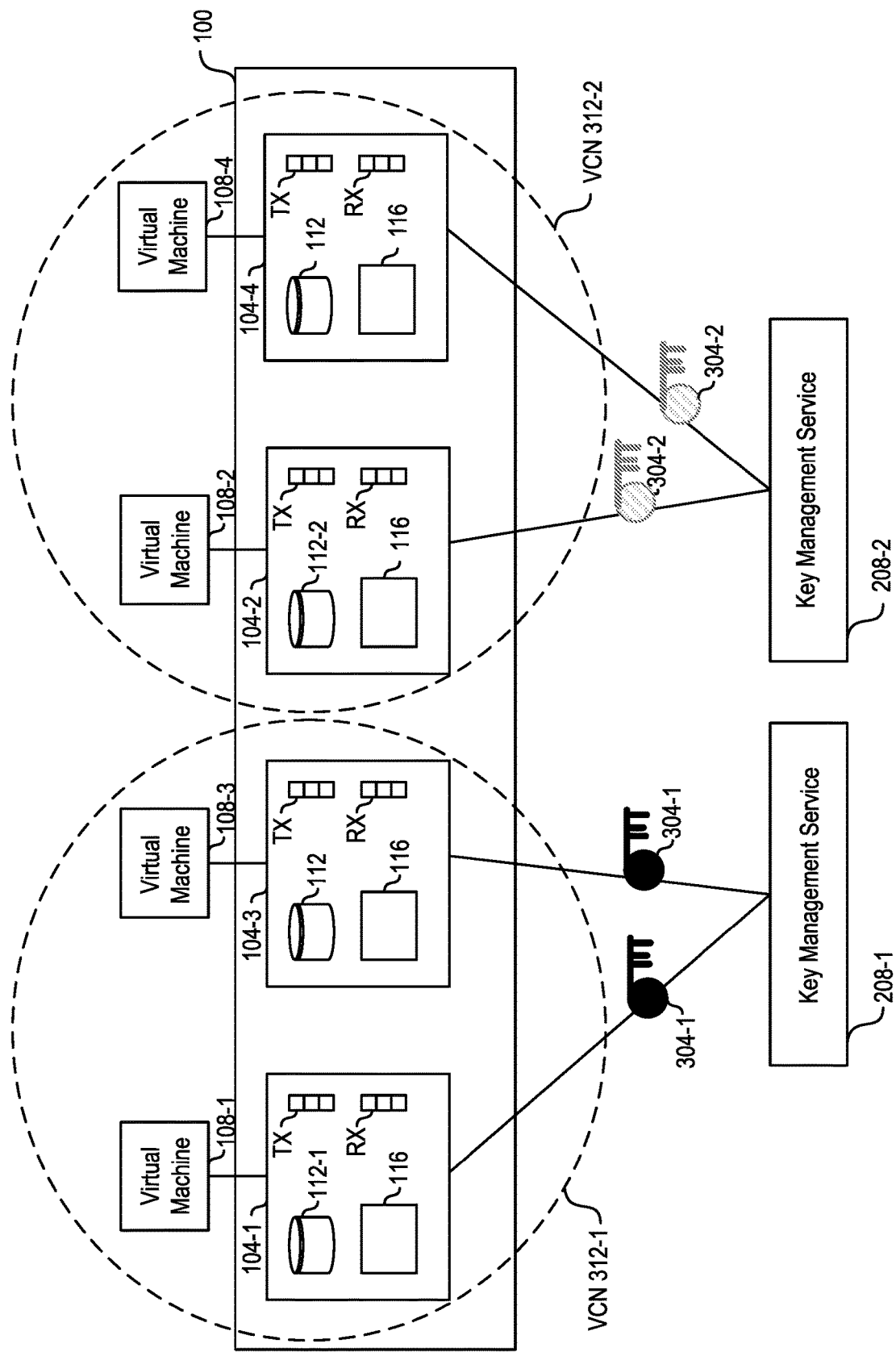
FIG. 3 is a depiction of one embodiment of a network virtualization device supporting multiple customers with different crypto keys.

FIG. 3 is a depiction of one embodiment of a network virtualization device 100 supporting multiple clients with different crypto keys 304. The network virtualization device 100 comprises a first virtualization engine 104-1, a second virtualization engine 104-2, a third virtualization engine 104-3, and a fourth virtualization engine 104-4. The first virtualization engine 104-1 is configured to instantiate a first virtual machine 108-1. The second virtualization engine 104-2 is configured to instantiate a second virtual machine 108-2. The third virtualization engine 104-3 is configured to instantiate a third virtual machine 108-3. The fourth virtualization engine 104-4 is configured to instantiate a fourth virtual machine 108-4.

The first virtual machine 108-1 and the third virtual machine 108-3 are part of a first VCN 312-1. The second virtual machine 108-2 and the fourth virtual machine 108-4 are part of a second VCN 312-2. The first VCN 312-1 is for a first client. The second VCN 312-2 is for a second client, wherein the second client is not the same as the first client. Thus multiple NEVFs on one device can be used to support virtual machines belonging to different virtual cloud networks.

The first virtualization engine 104-1 and the third virtualization engine 104-3 receive a first crypto key 304-1 from a first key management service 208-1. The second virtualization engine 104-2 and the fourth virtualization engine 104-4 receive a second crypto key 304-2 from a second key management service 208-2. The second crypto key 304-2 is different than the first crypto key 304-1. In some embodiments, virtualization engines 104 of the second VCN 312-2 receive the second crypto key 304-2 from the same key management service as virtualization engines 104 of the first VCN 312-1 (e.g., virtualization engines 104 of the second VCN 312-2 receive the second crypto key 304-2 from the first key management service 208-1).

The first virtual engine 104-1 stores the first crypto key 304-1 in the first memory device 112-1. The second virtual engine 104-2 stores a second crypto key 304-2 in the second memory device 112-2. Similarly, the third virtualization engine 104-3 and the fourth virtualization engine 104-4 each store a respective crypto key 304 in a memory device 112. The host of the network virtualization device 100 does not have access to the first crypto key 304-1 or the second crypto key 304-2. By having one virtualization engine 104 per virtual machine 108 (e.g., by having dedicated resources, such as one memory device 112 per virtual machine 108) enables one network virtualization device 100 to securely support multiple VCNs 312 for multiple customers. Since each customer manages their own crypto key 304 for a VCN 312, each customer's data can be managed securely. Further, a data compromise of the host would not lead to a data compromise of the VCNs 312, thereby providing additional security confidence to customers.

Figure 4:
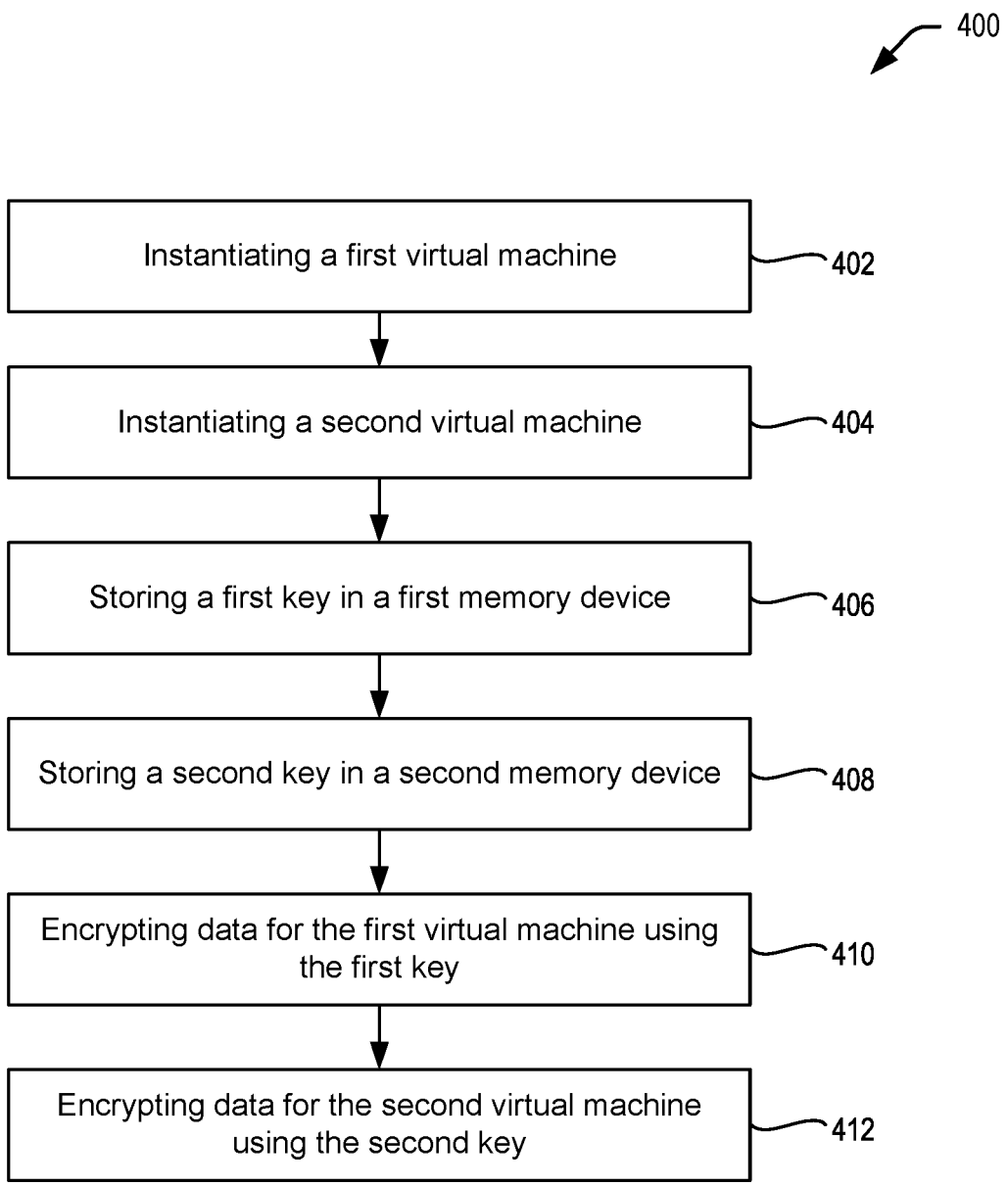
FIG. 4 is a flowchart illustrating one embodiment of a process for encrypting data in a virtual cloud network.

FIG. 4 is a flowchart illustrating one embodiment of a process 400 for encrypting data in a virtual cloud network. Process 400 begins in step 402 with instantiating a first virtual machine. For example, the first virtualization engine 104-1 instantiates a first virtual machine 108-1 as shown in FIG. 1. In step 404, a second virtual machine is instantiated. For example, the second virtualization engine 104-2 instantiates the second virtual machine 108-2 in FIG. 1. The virtualization engine 104 comprises a memory device 112 and a crypto processor 116, as shown in FIG. 1.

A first key is stored in a first memory device, step 406. For example, crypto key 204 is stored in the first memory device 112-1 of the first virtualization engine 104-1, as shown in FIG. 2. The first key can be retrieved from (e.g., requested from or pushed by) a key management service. In some embodiments, a customer of a virtual cloud network has control over the first key so the host of the first virtualization engine 104-1 does not have access to the key.

A second key is stored in a second memory device, step 408. For example, crypto key 204 is stored in the second memory device 112-2 of the second virtualization engine 104-2, as shown in FIG. 2. The second key can be retrieved from (e.g., requested from or pushed by) the key management service. In some embodiments, a customer of a virtual cloud network has control over the second key so the host of the virtualization engine 104 does not have access to the second key. The second key can be the same as the first key as shown in FIG. 2. The second key can be different than the first key, as shown in FIG. 3. For example, the second key could be different from the first key because the second virtual machine is part of a different virtual cloud network than the first virtual machine.

In step 410, data for the first virtual machine is encrypted using the first key. For example, the first crypto processor 116-1 encrypts transmit data TX from the first virtual machine 108-1 in FIG. 1. In step 412, data for the second virtual machine is encrypted using the second key. For example, the second crypto processor 116-2 encrypts transmit data TX from the second virtual machine 108-2 in FIG. 1. If the first virtual machine 108-1 and the second virtual machine 108-2 are part of the same virtual cloud network, then the first virtual machine 108-1 can transmit and/or and receive data, securely, from into the second virtual machine 108-2 using the same key (e.g., see FIG. 2). However, if the first key is different from the second key, as shown in FIG. 3, than the first virtual machine 108-1 does not send and/or receive encrypted data from the second virtual machine 108-2 (unless there was some sort of additional arrangement between the first VCN 312-1 and the second VCN 312-2 in FIG. 3).

The first virtualization engine 104-1 and the second virtualization engine 104-2 are on the same device (e.g., part of the same card in a server). Since the virtualization engine 104 is used to instantiate only one virtual machine, and/or since the virtualization engine has one or more dedicated resources, data to and from each virtual machine can be securely encrypted and/or decrypted without a host of the network virtualization device having access to the first key or the second key.

Figure 5:
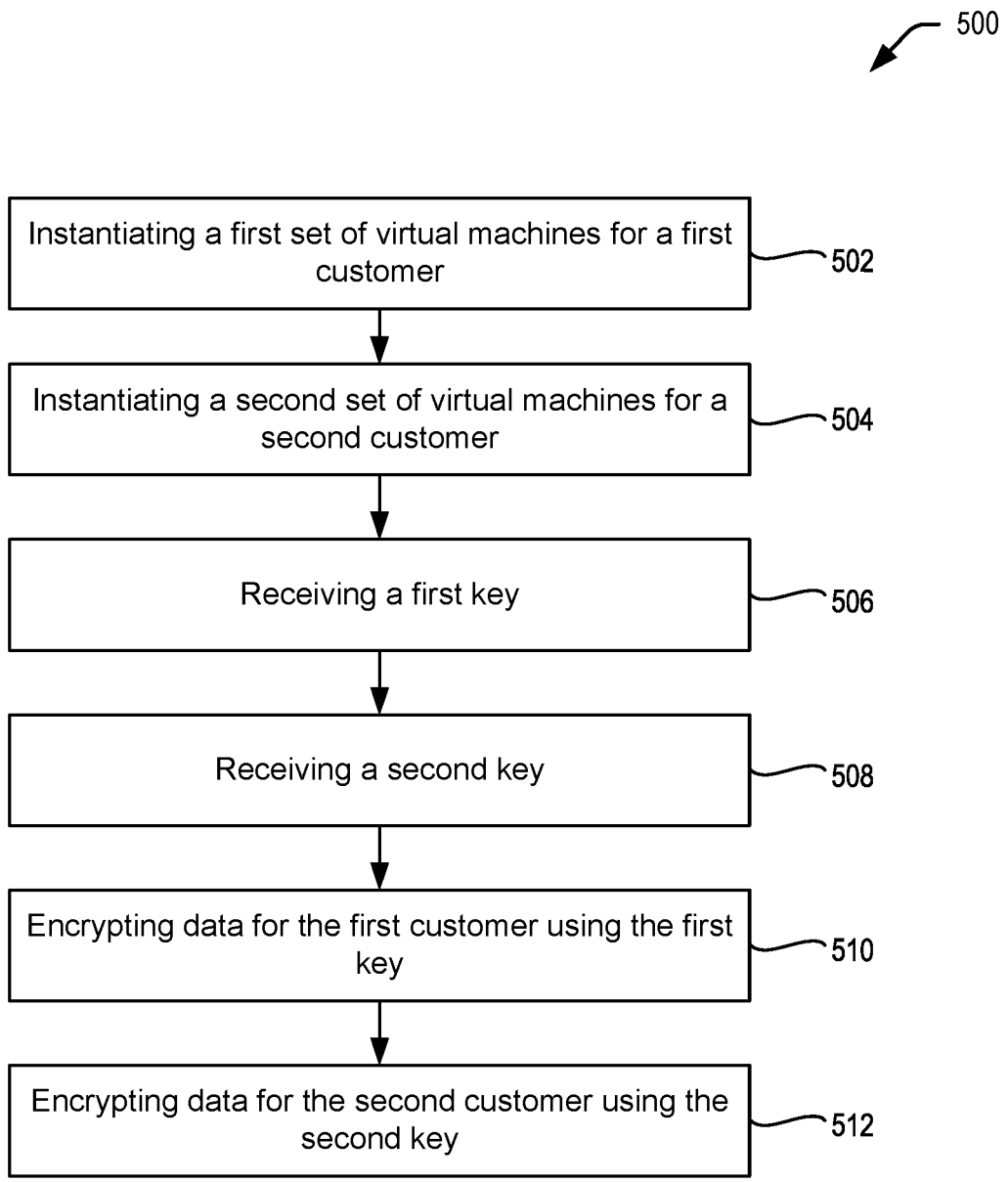
FIG. 5 is a flowchart illustrating one embodiment of a process for using multiple crypto keys for data encryption for multiple virtual cloud networks.

FIG. 5 is a flowchart illustrating one embodiment of a process 500 for using multiple crypto keys for data encryption for multiple virtual cloud networks. Process 500 begins in step 502 with instantiating a first set of virtual machines for a first customer. A first set of virtual engines are used to instantiate the first set of virtual machines. The first set of virtual machines are part of a first virtual cloud network. In this embodiment, a set comprises two or more. For example, the first virtualization engine 104-1 and the third virtualization engine 104-3 are used to instantiate the first virtual machine 108-1 and the third virtual machine 108-3 in FIG. 3; the first virtual machine 108-1 and the third virtual machine 108-3 are part of the first virtual cloud network 312-1.

A second set of virtual machines are instantiated for a second customer, step 504. A second set of virtual engines are used to instantiate the second set of virtual machines. The second set of virtual machines are part of a second virtual cloud network. For example, the second virtualization engine 104-2 and the fourth virtualization engine 104-4 are used to instantiate the second virtual machine 108-2 and the fourth virtual machine 108-4 in FIG. 3; the second virtual machine 108-2 and the fourth virtual machine 108-4 are part of the second virtual cloud network 312-2.

In step 506 the first key, e.g., first crypto key 304-1 in FIG. 3, is received by the virtualization engines used to instantiate the virtual machines of the first virtual cloud network. A second key, e.g., the second crypto key 304-2 in FIG. 3, is received by the virtualization engines used to instantiate the virtual machines of the second virtual cloud network, step 508. The first key can be received from a first key management service and the second key can be received from a second key management service, different from the first key management service. The first key is used to encrypt data for the first customer, step 510. The second key is used to encrypt data for the second customer, step 512. The host does not have access to the first key and/or the second key.

Figure 6:
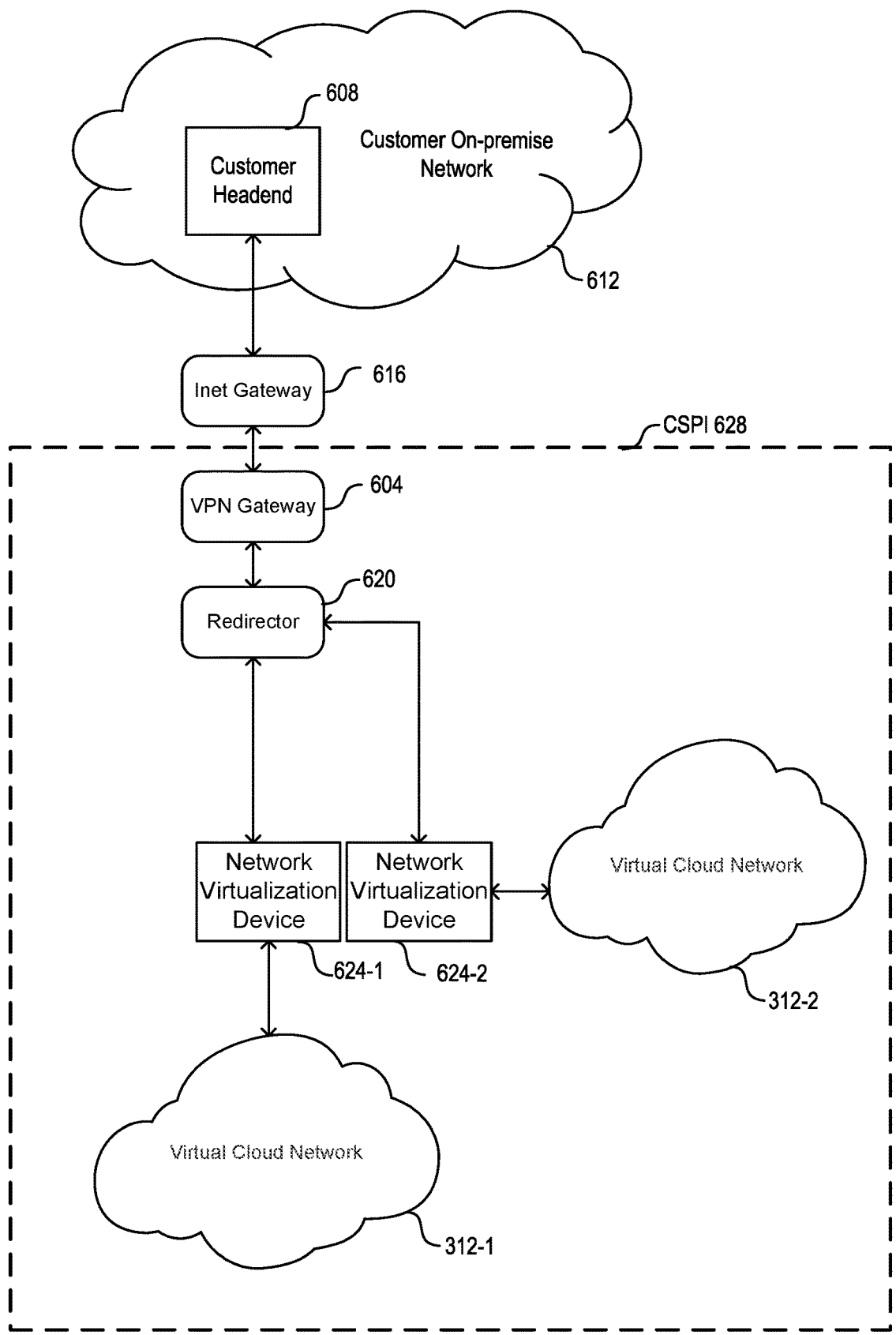
FIG. 6 is a depiction of one embodiment of a virtual cloud network receiving data through a VPN gateway.

FIG. 6 is a depiction of one embodiment of a virtual cloud network 312 receiving data through a VPN (Virtual Private Network) gateway 604. Data is encrypted on a customer headend 608 (e.g., a VPN headend). A headend is a device used as a termination for a secured transmission link. The customer headend 608 is part of a customer on-premise network 612. Data is transmitted from the customer headend 608 to the VPN gateway 604 (e.g., through an Inet gateway 616). The VPN gateway is owned and/or operated by a host of the VCN 312. An Internet Protocol SECurity (IPSec) tunnel can be formed from the customer headend 608 to the VPN gateway 604, so that data packets are encrypted at the customer headend 608 and decrypted at the VPN gateway 604; and vice versa for encrypted data sent from the VPN Gateway 604 to the customer headend 608. Data sent from the customer headend 608 to the VPN gateway 604 can be sent over public links (e.g., the Internet) or private links (e.g., using Oracle FastConnect). The IPSec tunnel can use layer 1 and/or layer 2 encryption.

At the VPN gateway 604, the host can receive data from one or more customers. In some embodiments, the VPN gateway 604 can be a dedicated bare-metal host for a single customer or a multi-tenant host with network hardware with multiple NEVFs terminating VPN connections from multiple customers. The redirector 620 is used to route data from a first customer to a first network virtualization device 624-1, and to route data from a second customer to a second network virtualization device 624-2. The first network virtualization device 624-1 encrypts data of the first customer for a first virtual cloud network 312-1. The second network virtualization device 624-2 encrypts data of the second customer for a second virtual cloud network 312-2.

Unencrypted data is sent from the VPN gateway 604 to a redirector 620. The network virtualization device 624 is configured to encrypt data for a virtual cloud network 312. For example, the network virtualization device 624 is a virtualization engine 104 as shown in FIG. 2. The virtual engine 104 can receive a crypto key 204 from the key management service 208, as shown in FIG. 2, so that data within a virtual cloud network 312 can be encrypted using a crypto key 204 provisioned by the customer.

A customer on-premise network 612 comprises devices owned and/or maintained by the host. For example, the customer headend 608 is a network card in a machine owned and/or maintained by the customer. In some embodiments, the customer headend 608 is separated from the VPN gateway 604 (e.g., a network card owned and/or maintained by the host) by 5, 10, 20, 50, 100, 500 or more kilometers.

The VPN gateway 604, the redirector 620, and the network virtualization devices 624 are part of a cloud service provider infrastructure (CSPI) 628. The host owns and/or maintains the CSPI 628. Accordingly, the host manages data security, if any, from the VPN gateway 604 to the network virtualization device 624. Additionally, for the IPSec tunnel to be established from the customer headend 608 to the VPN gateway 604, the customer and the host share a key (e.g., for symmetric encryption) and/or keys (e.g., for asymmetric encryption). For example, the host could give a customer a key for establishing the IPSec tunnel, the customer could provide the host the key, or the customer and host could agree on an encryption scheme.

Figure 7:
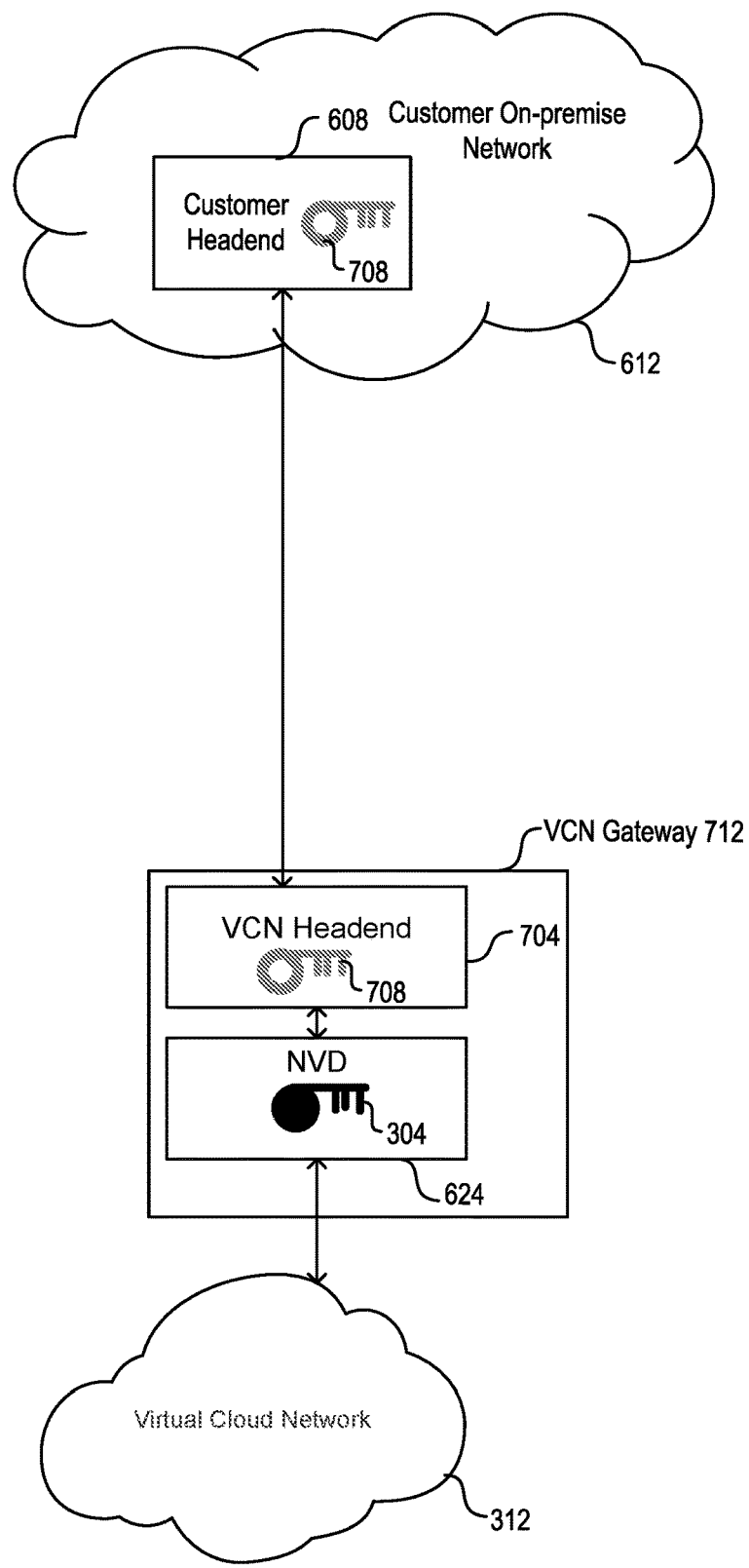
FIG. 7 is a depiction of one embodiment of a virtual cloud network receiving data through a Virtual Cloud Network (VCN) headend.

FIG. 7 is a depiction of one embodiment of a virtual cloud network receiving data through a Virtual Cloud Network (VCN) headend 704. In some situations, a customer might desire to reach a virtual cloud network 312 securely from the customer on-premise network 612, without the host having access to the data and/or keys used for encryption. For example, the VPN gateway 604 uses an encryption key that the host has access to, in order to decrypt data from the customer headend 608. Further, a customer might desire to not have its data transmitted unencrypted between machines of the host. For example, data is not encrypted through the redirector 620 in FIG. 6.

A VCN headend 704 is used to enable a customer to reach a VCN securely from their own on-premise network (referred to as end-to-end encryption in this disclosure) and/or allow the customer to control/manage the encryption key(s). The VCN headend 704 is a network resource dedicated to a specific customer (e.g., the host provides electricity and/or cooling, but the host cannot log into the VCN headend 704). In some embodiments, the VCN headend 704 is or can include a SmartNIC or other network virtualization device such as one or several NICs, SmartToRs, or the like. A SmartNIC can be an application-specific integrated circuit (ASIC), a field programmable gate array (FPGA), or a system on a chip (SoC). The VCN headend 704 can comprise one or more processors and one or more memory devices.

Data is encrypted from the customer headend 608 to the VCN headend 704 using an encryption key 708. The VCN headend 704 can be configured to receive encrypted data over public links (e.g., the public Internet) and/or over private links (e.g., Oracle FastConnect). For example, a VPN tunnel is formed from the customer headend 608 to the VCN headend 704, and the customer headend 608 and the VCN headend 704 are termination points of the VPN tunnel. So instead of terminating the VPN tunnel at the VPN gateway 604 as shown in FIG. 6, the VPN tunnel terminates at the VCN headend 704 (e.g., bypassing the VPN gateway 604 and/or bypassing the redirector 620).

Since the VCN headend 704 is a resource dedicated to the customer, the customer can provision the encryption key 708 securely in a memory device of the VCN headend 704. For example, the customer could log into the VCN headend 704 to provision the encryption key 708, and/or the customer could use the key management service 208 in FIG. 2 to provision the encryption key 708, similar to using the key management service 208 to provision the crypto key 304 to a virtualization device 104. For example, the key management service 208 could provide the encryption key 708 to the VCN headend 704 after confirming (e.g., authenticating) the VCN headend 704 has proper permission or credentials to receive the encryption key 708.

The VCN headend 704, in certain embodiments, is a physical device that does not provide a virtual function. Decrypted data is sent from the VCN headend 704 to the network virtualization device 624. In the embodiment shown, the VCN headend 704 and the network virtualization device 624 are part of a VCN gateway 712. For example, the VCN gateway 712 is a physical host with two network cards, one network card for the VCN headend 704 and a second network card for the network virtualization device 624. The VCN gateway 712 can be dedicated to a customer such that no other customers of the host use the VCN gateway 712. In an example, the VCN headend 704 and the network virtualization device 624 are part of the same server to increase security while unencrypted data is being transmitted from the VCN headend 704 to the network virtualization device 624. In some embodiments, the VCN headend 704 is on the same board (e.g., network card), on a same rack, and/or in a same room as the network virtualization device 624 (e.g., for security). The VCN headend 704 and the network virtualization device 624 can be part of a high-performance NIC to handle traffic as needed. The VCN gateway 712 has the ability to terminate an IPSec tunnel and also has an NEVF to provision the crypto key to encrypt traffic and send it into a virtual cloud network. The VCN gateway 712 allows the customer to control/manage both the crypto key 304 and the encryption key 708. Though the VCN gateway 712 is part of the cloud service provider infrastructure (infrastructure of the host), the host does not manage or have access to the encryption key 708.

The network virtualization device 624 is used to encrypt data (e.g., using a network encryption virtual function) for the virtual cloud network 312. For example, the network virtualization device 624 is a virtualization engine 104 as described in FIGS. 1-3 and uses the crypto key 304 to encrypt data for the virtual cloud network 312. Thus, the network virtualization device 624 can provide an instance of a virtual machine in the virtual cloud network 312.

In some embodiments, the network virtualization device 624 is part of the VCN headend 704, allowing the VPN tunnel to be terminated at an instance of the virtual cloud network 312. The VCN gateway 712 can be used to decrypt data using the encryption key 708 and encrypt data using the crypto key 304.

In some configurations, one customer can have two or more VCN headends 704. For example, a customer with high volume might have multiple VCN headends 704 for increased bandwidth for securely uploading and/or downloading data to one or more virtual cloud networks 312. One encryption key 708 could be used for multiple VCN headends 704 supporting one customer, or different encryption keys 708 could be used for different VCN headends 704. With the customer provisioning the encryption key(s) 708, the customer could decide whether to have one encryption key 708 or multiple encryption keys 708. In some embodiments, one NIC is used for multiple VCN headends 704.

In some configurations, the encryption key 708 is a long-lived key (e.g., rotated or changed on a weekly, monthly, or manual basis). The crypto key 304 could be a short-lived key (e.g., rotated or changed less than weekly or daily, such as every 4, 8, 12, 24, or 36 hours). Thus the encryption key 708 can be configured to be changed less frequently than the crypto key 304.

A system can comprise a network headend device (e.g., the VCN headend 704). The network headend device can be configured to receive a first key (e.g., the encryption key 708) provisioned by the customer (e.g., the customer can log into the VCN headend 704 to provision the first key and/or use a key management service). The network headend device is configured to receive a first data packet from a device of a customer. For example, the network headend device is configured to receive data from the customer headend 608. The network headend device is configured to decrypt the first data packet using the first key to obtain information. The information is at least a portion of the decrypted data. A network virtualization device (e.g., network virtualization device 624) is configured to receive the information from the network headend device, after the first data packet is decrypted; ascertain that the information is to be sent to a virtual machine in a virtual cloud network (e.g., a virtual machine in the virtual cloud network 312); and encrypt the information with a second key to generate a second data packet. For example, the information is encrypted using the crypto key 304. The second data packet is routed to the virtual machine (e.g., to a network virtualization device used to instantiate the virtual machine).

Figure 8:
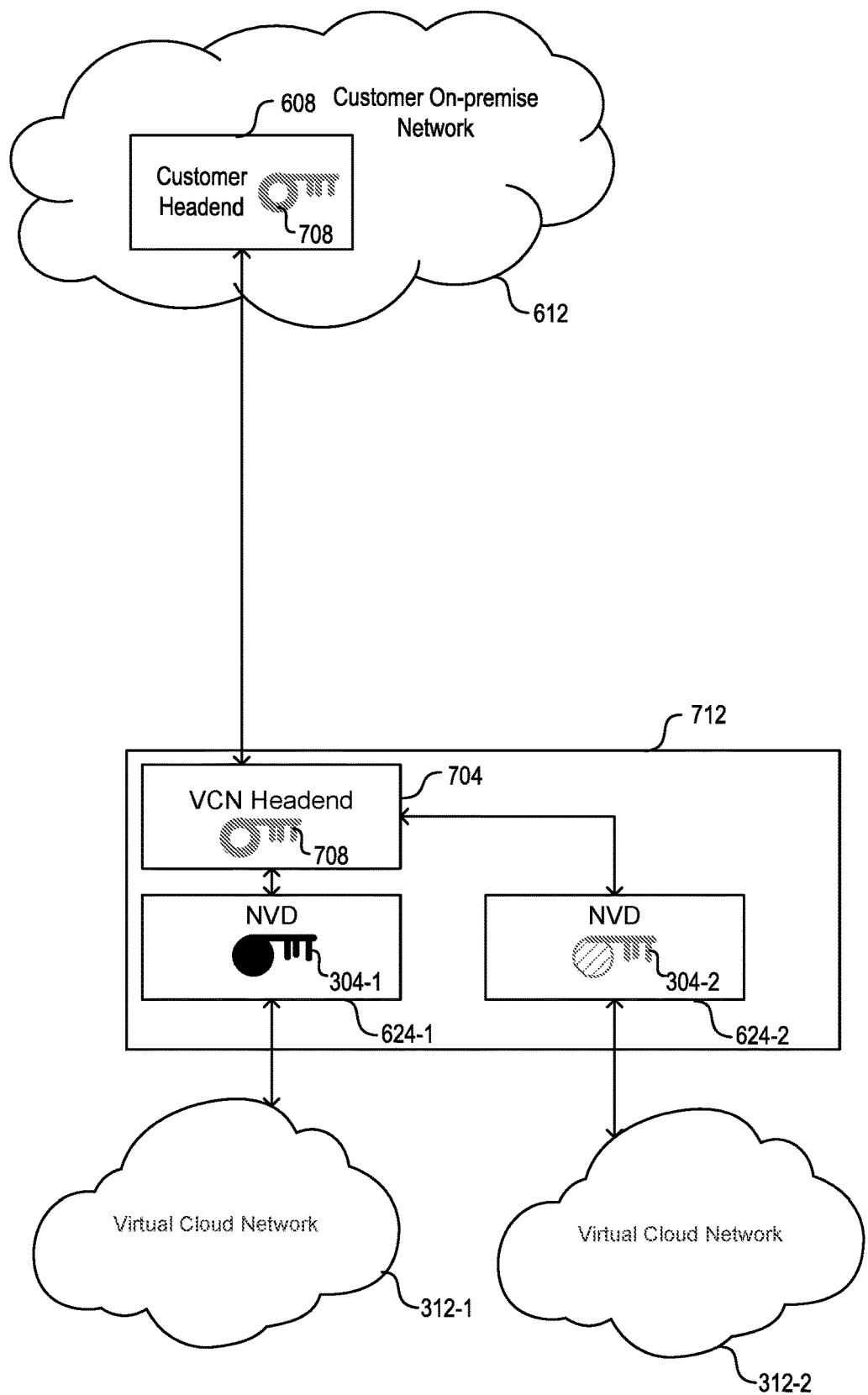
FIG. 8 is a depiction of an embodiment of one VCN headend supporting more than one virtual cloud network.

FIG. 8 is a depiction of an embodiment of one VCN gateway 712 supporting more than one virtual cloud networks 312 for a customer. Data from a customer headend 608 is securely transmitted to a VCN headend 704 using the encryption key 708. The VCN headend 704 is part of the VCN gateway 712. The VCN gateway comprises a first network virtualization device 624-1 and a second network virtualization device 624-2. Though two network virtualization devices 624, and two virtual cloud networks 312, are shown, more than two can be used (e.g., 3, 4, 5, 10, 20, or more). As mentioned in conjunction with FIG. 7, more than one VCN headend 704 could also be used (e.g., 2, 3, 4, or more).

After decrypting data received from the customer headend 608, the VCN headend 704 determines if the data is intended for the first virtual cloud network 312-1, the second virtual cloud network 312-2, or both the first virtual cloud network 312-1 and the second virtual cloud network 312-2. For data intended for the first virtual cloud network 312-1, the data is re-encrypted using the first crypto key 304-1 using the first network virtualization device 624-1, and sent to the first virtual network 312-1; for data intended for the second virtual cloud network 312-2, data is re-encrypted using the second crypto key 304-2 using the second network virtualization device 624-2, and sent to the second virtual cloud network 312-2. Thus one VCN headend 704 can be used to support multiple virtual cloud networks 312 for a customer. In some embodiments, one NIC is used for a plurality of network virtualization devices 624. In some embodiments, the plurality of network virtualization devices 624 are part of the same NIC as the VCN headend 704. In other embodiments, the VCN headend 704 is on a different NIC than the network virtualization device 624.

Figure 9:
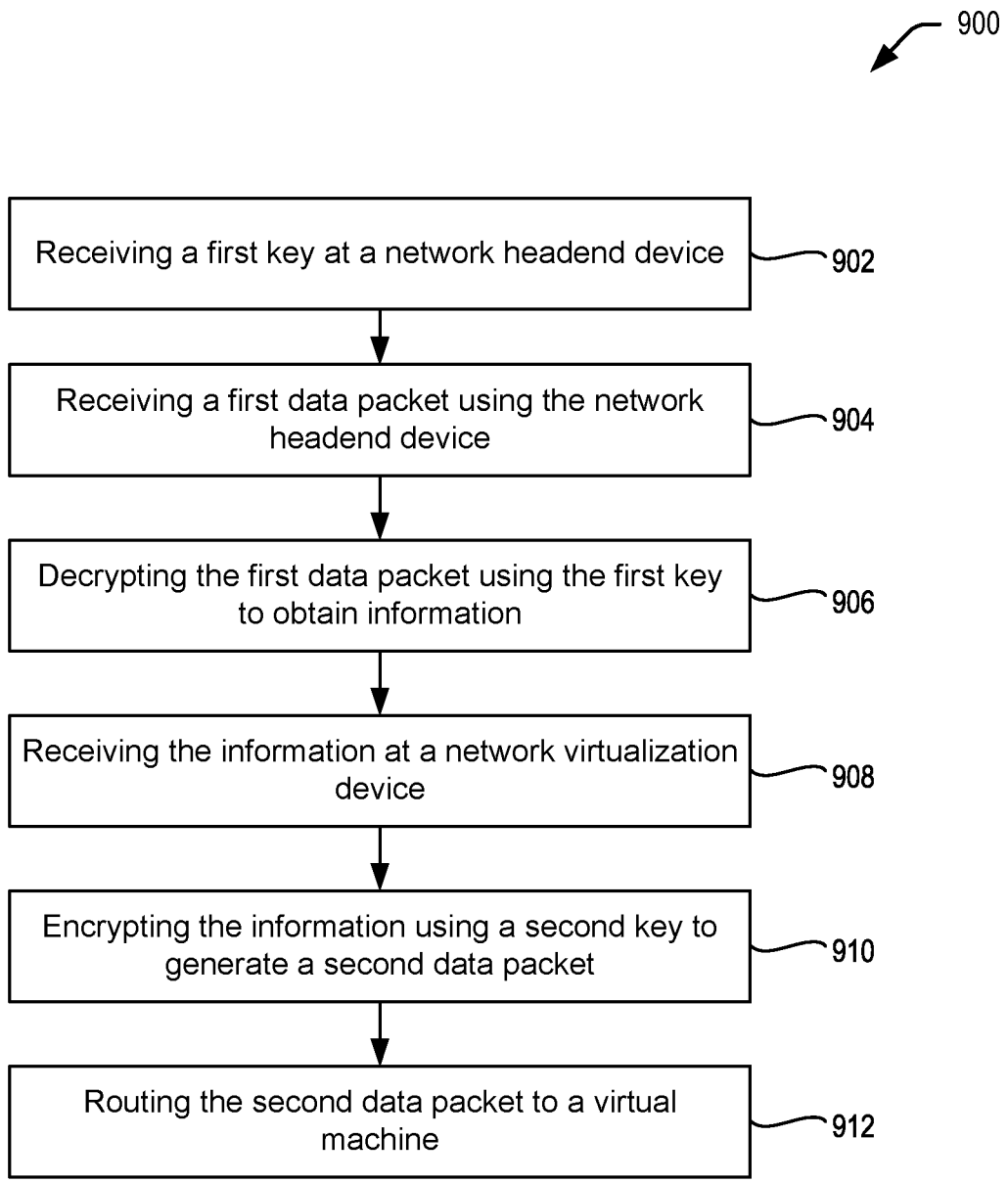
FIG. 9 is a flowchart illustrating one embodiment of a process for end-to-end encryption for a virtual cloud network.

FIG. 9 is a flowchart illustrating one embodiment of a process 900 for end-to-end encryption for a virtual cloud network. Process 900 begins in step 902 with receiving a first key in a network headend device. For example, the encryption key 708 shown in FIG. 7 is the first key, and the VCN headend 704 is the network headend device. The first key can be provisioned by a customer (e.g., so that the first key is managed by the customer, without the host knowing what the first key is). In step 904, the network headend device receives a first data packet. For example, the VCN headend 704 receives encrypted data from a device of the customer (e.g., from the customer headend 608). The network headend device decrypts the first data packet to obtain information, step 906. The information is at least a portion of the decrypted first data packet. In some embodiments, a gateway (e.g., VPN gateway 604 in FIG. 6) can terminate a VPN tunnel from the customer headend 608 using the first key, and re-encrypt traffic with a second key to send packets to instances (e.g., VMs/BMs) in a VCN, where the second key is the VCN encryption key.

The network headend device transmits the information to a network virtualization device, so that the network virtualization device receives the information from the network headend device, step 908. For example, the VCN headend 704 transmits decrypted data to the network virtualization device 624 in FIG. 7. In some embodiments, the network virtualization device 624 can be an integral component of the VCN headend 704. In step 910, the network virtualization device encrypts the information using a second key to generate a second data packet. For example, the network virtualization device 624 uses the crypto key 304 to encrypt data for the virtual cloud network 312. The second data packet is then routed to a virtual machine in the virtual cloud network. For example, encrypted data is sent by the network virtualization device 624 to the virtual cloud network 312 in FIG. 7.

In some configurations, data from the customer headend 608 to the VCN headend 704 in FIG. 7 is encrypted, or data from the network virtualization device 624 to the virtual cloud network 312 is encrypted, but not both. In some embodiments, the network virtualization device 624 ascertains that data in the virtual cloud network is to be encrypted before encrypting the information received from the VCN headend 704.

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will use the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 10:
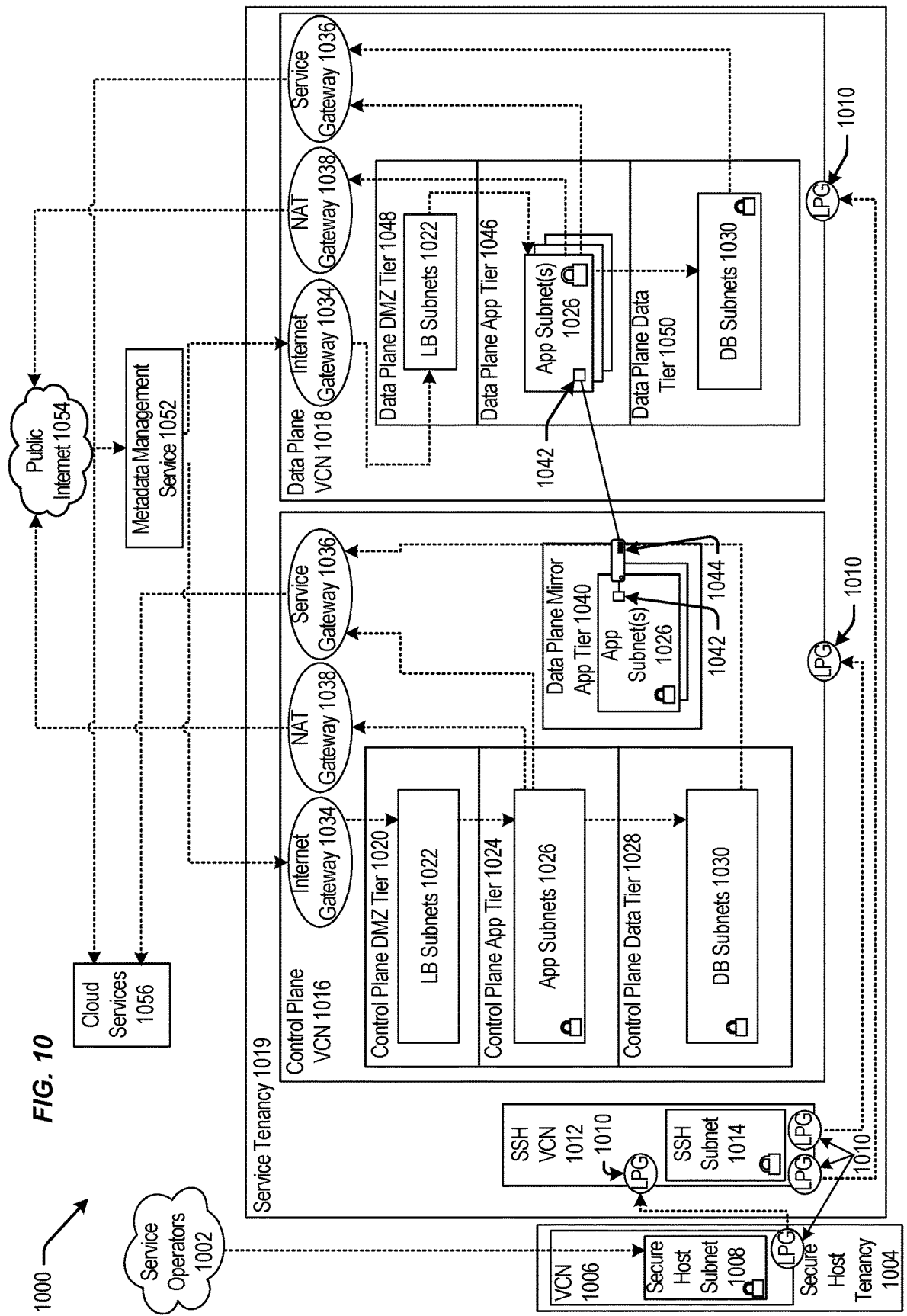
FIG. 10 is a block diagram illustrating one pattern for implementing a cloud infrastructure as a service system, according to at least one embodiment.

FIG. 10 is a block diagram 1000 illustrating an example pattern of an IaaS architecture, according to at least one embodiment. Service operators 1002 can be communicatively coupled to a secure host tenancy 1004 that can include a virtual cloud network (VCN) 1006 and a secure host subnet 1008. In some examples, the service operators 1002 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1006 and/or the Internet.

The VCN 1006 can include a local peering gateway (LPG) 1010 that can be communicatively coupled to a secure shell (SSH) VCN 1012 via an LPG 1010 contained in the SSH VCN 1012. The SSH VCN 1012 can include an SSH subnet 1014, and the SSH VCN 1012 can be communicatively coupled to a control plane VCN 1016 via the LPG 1010 contained in the control plane VCN 1016. Also, the SSH VCN 1012 can be communicatively coupled to a data plane VCN 1018 via an LPG 1010. The control plane VCN 1016 and the data plane VCN 1018 can be contained in a service tenancy 1019 that can be owned and/or operated by the IaaS provider.

The control plane VCN 1016 can include a control plane demilitarized zone (DMZ) tier 1020 that acts as a perimeter network (e.g., portions of a corporate network between the corporate intranet and external networks). The DMZ-based servers may have restricted responsibilities and help keep security breaches contained. Additionally, the DMZ tier 1020 can include one or more load balancer (LB) subnet(s) 1022, a control plane app tier 1024 that can include app subnet(s) 1026, a control plane data tier 1028 that can include database (DB) subnet(s) 1030 (e.g., frontend DB subnet(s) and/or backend DB subnet(s)). The LB subnet(s) 1022 contained in the control plane DMZ tier 1020 can be communicatively coupled to the app subnet(s) 1026 contained in the control plane app tier 1024 and an Internet gateway 1034 that can be contained in the control plane VCN 1016, and the app subnet(s) 1026 can be communicatively coupled to the DB subnet(s) 1030 contained in the control plane data tier 1028 and a service gateway 1036 and a network address translation (NAT) gateway 1038. The control plane VCN 1016 can include the service gateway 1036 and the NAT gateway 1038.

The control plane VCN 1016 can include a data plane mirror app tier 1040 that can include app subnet(s) 1026. The app subnet(s) 1026 contained in the data plane mirror app tier 1040 can include a virtual network interface controller (VNIC) 1042 that can execute a compute instance 1044. The compute instance 1044 can communicatively couple the app subnet(s) 1026 of the data plane mirror app tier 1040 to app subnet(s) 1026 that can be contained in a data plane app tier 1046.

The data plane VCN 1018 can include the data plane app tier 1046, a data plane DMZ tier 1048, and a data plane data tier 1050. The data plane DMZ tier 1048 can include LB subnet(s) 1022 that can be communicatively coupled to the app subnet(s) 1026 of the data plane app tier 1046 and the Internet gateway 1034 of the data plane VCN 1018. The app subnet(s) 1026 can be communicatively coupled to the service gateway 1036 of the data plane VCN 1018 and the NAT gateway 1038 of the data plane VCN 1018. The data plane data tier 1050 can also include the DB subnet(s) 1030 that can be communicatively coupled to the app subnet(s) 1026 of the data plane app tier 1046.

The Internet gateway 1034 of the control plane VCN 1016 and of the data plane VCN 1018 can be communicatively coupled to a metadata management service 1052 that can be communicatively coupled to public Internet 1054. Public Internet 1054 can be communicatively coupled to the NAT gateway 1038 of the control plane VCN 1016 and of the data plane VCN 1018. The service gateway 1036 of the control plane VCN 1016 and of the data plane VCN 1018 can be communicatively couple to cloud services 1056.

In some examples, the service gateway 1036 of the control plane VCN 1016 or of the data plan VCN 1018 can make application programming interface (API) calls to cloud services 1056 without going through public Internet 1054. The API calls to cloud services 1056 from the service gateway 1036 can be one-way: the service gateway 1036 can make API calls to cloud services 1056, and cloud services 1056 can send requested data to the service gateway 1036. But, cloud services 1056 may not initiate API calls to the service gateway 1036.

In some examples, the secure host tenancy 1004 can be directly connected to the service tenancy 1019, which may be otherwise isolated. The secure host subnet 1008 can communicate with the SSH subnet 1014 through an LPG 1010 that may enable two-way communication over an otherwise isolated system. Connecting the secure host subnet 1008 to the SSH subnet 1014 may give the secure host subnet 1008 access to other entities within the service tenancy 1019.

The control plane VCN 1016 may allow users of the service tenancy 1019 to set up or otherwise provision desired resources. Desired resources provisioned in the control plane VCN 1016 may be deployed or otherwise used in the data plane VCN 1018. In some examples, the control plane VCN 1016 can be isolated from the data plane VCN 1018, and the data plane mirror app tier 1040 of the control plane VCN 1016 can communicate with the data plane app tier 1046 of the data plane VCN 1018 via VNICs 1042 that can be contained in the data plane mirror app tier 1040 and the data plane app tier 1046.

In some examples, users of the system, or customers, can make requests, for example create, read, update, or delete (CRUD) operations, through public Internet 1054 that can communicate the requests to the metadata management service 1052. The metadata management service 1052 can communicate the request to the control plane VCN 1016 through the Internet gateway 1034. The request can be received by the LB subnet(s) 1022 contained in the control plane DMZ tier 1020. The LB subnet(s) 1022 may determine that the request is valid, and in response to this determination, the LB subnet(s) 1022 can transmit the request to app subnet(s) 1026 contained in the control plane app tier 1024. If the request is validated and requires a call to public Internet 1054, the call to public Internet 1054 may be transmitted to the NAT gateway 1038 that can make the call to public Internet 1054. Memory that may be desired to be stored by the request can be stored in the DB subnet(s) 1030.

In some examples, the data plane mirror app tier 1040 can facilitate direct communication between the control plane VCN 1016 and the data plane VCN 1018. For example, changes, updates, or other suitable modifications to configuration may be desired to be applied to the resources contained in the data plane VCN 1018. Via a VNIC 1042, the control plane VCN 1016 can directly communicate with, and can thereby execute the changes, updates, or other suitable modifications to configuration to, resources contained in the data plane VCN 1018.

In some embodiments, the control plane VCN 1016 and the data plane VCN 1018 can be contained in the service tenancy 1019. In this case, the user, or the customer, of the system may not own or operate either the control plane VCN 1016 or the data plane VCN 1018. Instead, the IaaS provider may own or operate the control plane VCN 1016 and the data plane VCN 1018, both of which may be contained in the service tenancy 1019. This embodiment can enable isolation of networks that may prevent users or customers from interacting with other users', or other customers', resources. Also, this embodiment may allow users or customers of the system to store databases privately without needing to rely on public Internet 1054, which may not have a desired level of security, for storage.

In other embodiments, the LB subnet(s) 1022 contained in the control plane VCN 1016 can be configured to receive a signal from the service gateway 1036. In this embodiment, the control plane VCN 1016 and the data plane VCN 1018 may be configured to be called by a customer of the IaaS provider without calling public Internet 1054. Customers of the IaaS provider may desire this embodiment since database(s) that the customers use may be controlled by the IaaS provider and may be stored on the service tenancy 1019, which may be isolated from public Internet 1054.

Figure 11:
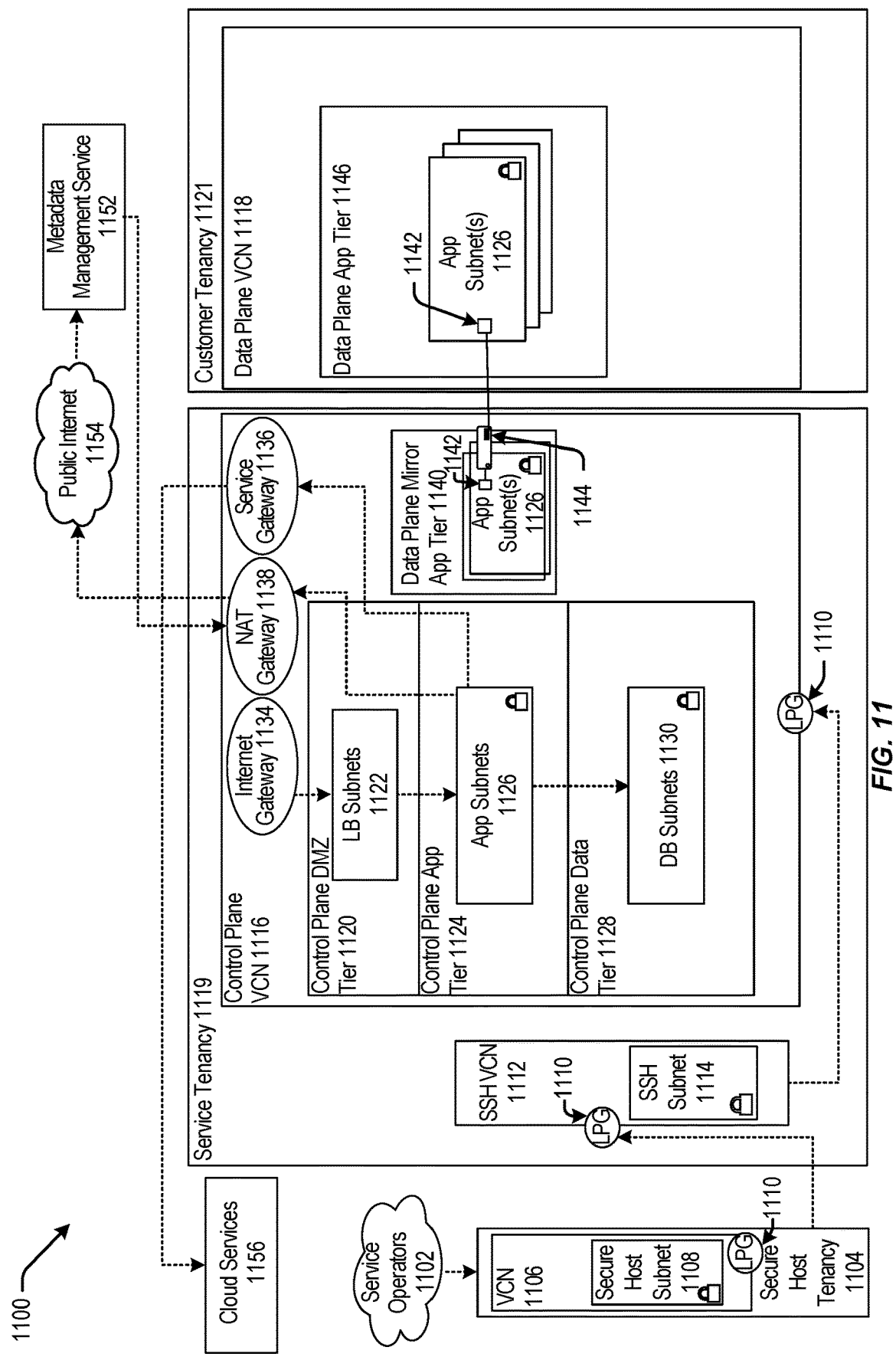
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 1002 of FIG. 10) can be communicatively coupled to a secure host tenancy 1104 (e.g. the secure host tenancy 1004 of FIG. 10) that can include a virtual cloud network (VCN) 1106 (e.g. the VCN 1006 of FIG. 10) and a secure host subnet 1108 (e.g. the secure host subnet 1008 of FIG. 10). The VCN 1106 can include a local peering gateway (LPG) 1110 (e.g. the LPG 1010 of FIG. 10) that can be communicatively coupled to a secure shell (SSH) VCN 1112 (e.g. the SSH VCN 1012 of FIG. 10) via an LPG 1010 contained in the SSH VCN 1112. The SSH VCN 1112 can include an SSH subnet 1114 (e.g. the SSH subnet 1014 of FIG. 10), and the SSH VCN 1112 can be communicatively coupled to a control plane VCN 1116 (e.g. the control plane VCN 1016 of FIG. 10) via an LPG 1110 contained in the control plane VCN 1116. The control plane VCN 1116 can be contained in a service tenancy 1119 (e.g. the service tenancy 1019 of FIG. 10), and the data plane VCN 1118 (e.g. the data plane VCN 1018 of FIG. 10) can be contained in a customer tenancy 1121 that may be owned or operated by users, or customers, of the system.

The control plane VCN 1116 can include a control plane DMZ tier 1120 (e.g. the control plane DMZ tier 1020 of FIG. 10) that can include LB subnet(s) 1122 (e.g. LB subnet(s) 1022 of FIG. 10), a control plane app tier 1124 (e.g. the control plane app tier 1024 of FIG. 10) that can include app subnet(s) 1126 (e.g. app subnet(s) 1026 of FIG. 10), a control plane data tier 1128 (e.g. the control plane data tier 1028 of FIG. 10) that can include database (DB) subnet(s) 1130 (e.g. similar to DB subnet(s) 1030 of FIG. 10). The LB subnet(s) 1122 contained in the control plane DMZ tier 1120 can be communicatively coupled to the app subnet(s) 1126 contained in the control plane app tier 1124 and an Internet gateway 1134 (e.g. the Internet gateway 1034 of FIG. 10) that can be contained in the control plane VCN 1116, and the app subnet(s) 1126 can be communicatively coupled to the DB subnet(s) 1130 contained in the control plane data tier 1128 and a service gateway 1136 (e.g. the service gateway of FIG. 10) and a network address translation (NAT) gateway 1138 (e.g. the NAT gateway 1038 of FIG. 10). The control plane VCN 1116 can include the service gateway 1136 and the NAT gateway 1138.

The control plane VCN 1116 can include a data plane mirror app tier 1140 (e.g. the data plane mirror app tier 1040 of FIG. 10) that can include app subnet(s) 1126. The app subnet(s) 1126 contained in the data plane mirror app tier 1140 can include a virtual network interface controller (VNIC) 1142 (e.g. the VNIC of 1042) that can execute a compute instance 1144 (e.g. similar to the compute instance 1044 of FIG. 10). The compute instance 1144 can facilitate communication between the app subnet(s) 1126 of the data plane mirror app tier 1140 and the app subnet(s) 1126 that can be contained in a data plane app tier 1146 (e.g. the data plane app tier 1046 of FIG. 10) via the VNIC 1142 contained in the data plane mirror app tier 1140 and the VNIC 1142 contained in the data plan app tier 1146.

The Internet gateway 1134 contained in the control plane VCN 1116 can be communicatively coupled to a metadata management service 1152 (e.g. the metadata management service 1052 of FIG. 10) that can be communicatively coupled to public Internet 1154 (e.g. public Internet 1054 of FIG. 10). Public Internet 1154 can be communicatively coupled to the NAT gateway 1138 contained in the control plane VCN 1116. The service gateway 1136 contained in the control plane VCN 1116 can be communicatively couple to cloud services 1156 (e.g. cloud services 1056 of FIG. 10).

In some examples, the data plane VCN 1118 can be contained in the customer tenancy 1121. In this case, the IaaS provider may provide the control plane VCN 1116 for each customer, and the IaaS provider may, for each customer, set up a unique compute instance 1144 that is contained in the service tenancy 1119. Each compute instance 1144 may allow communication between the control plane VCN 1116, contained in the service tenancy 1119, and the data plane VCN 1118 that is contained in the customer tenancy 1121. The compute instance 1144 may allow resources, that are provisioned in the control plane VCN 1116 that is contained in the service tenancy 1119, to be deployed or otherwise used in the data plane VCN 1118 that is contained in the customer tenancy 1121.

In other examples, the customer of the IaaS provider may have databases that live in the customer tenancy 1121. In this example, the control plane VCN 1116 can include the data plane mirror app tier 1140 that can include app subnet(s) 1126. The data plane mirror app tier 1140 can reside in the data plane VCN 1118, but the data plane mirror app tier 1140 may not live in the data plane VCN 1118. That is, the data plane mirror app tier 1140 may have access to the customer tenancy 1121, but the data plane mirror app tier 1140 may not exist in the data plane VCN 1118 or be owned or operated by the customer of the IaaS provider. The data plane mirror app tier 1140 may be configured to make calls to the data plane VCN 1118 but may not be configured to make calls to any entity contained in the control plane VCN 1116. The customer may desire to deploy or otherwise use resources in the data plane VCN 1118 that are provisioned in the control plane VCN 1116, and the data plane mirror app tier 1140 can facilitate the desired deployment, or other usage of resources, of the customer.

In some embodiments, the customer of the IaaS provider can apply filters to the data plane VCN 1118. In this embodiment, the customer can determine what the data plane VCN 1118 can access, and the customer may restrict access to public Internet 1154 from the data plane VCN 1118. The IaaS provider may not be able to apply filters or otherwise control access of the data plane VCN 1118 to any outside networks or databases. Applying filters and controls by the customer onto the data plane VCN 1118, contained in the customer tenancy 1121, can help isolate the data plane VCN 1118 from other customers and from public Internet 1154.

In some embodiments, cloud services 1156 can be called by the service gateway 1136 to access services that may not exist on public Internet 1154, on the control plane VCN 1116, or on the data plane VCN 1118. The connection between cloud services 1156 and the control plane VCN 1116 or the data plane VCN 1118 may not be live or continuous. Cloud services 1156 may exist on a different network owned or operated by the IaaS provider. Cloud services 1156 may be configured to receive calls from the service gateway 1136 and may be configured to not receive calls from public Internet 1154. Some cloud services 1156 may be isolated from other cloud services 1156, and the control plane VCN 1116 may be isolated from cloud services 1156 that may not be in the same region as the control plane VCN 1116. For example, the control plane VCN 1116 may be located in "Region 1," and cloud service "Deployment 10," may be located in Region 1 and in "Region 2." If a call to Deployment 10 is made by the service gateway 1136 contained in the control plane VCN 1116 located in Region 1, the call may be transmitted to Deployment 10 in Region 1. In this example, the control plane VCN 1116, or Deployment 10 in Region 1, may not be communicatively coupled to, or otherwise in communication with, Deployment 10 in Region 2.

Figure 12:
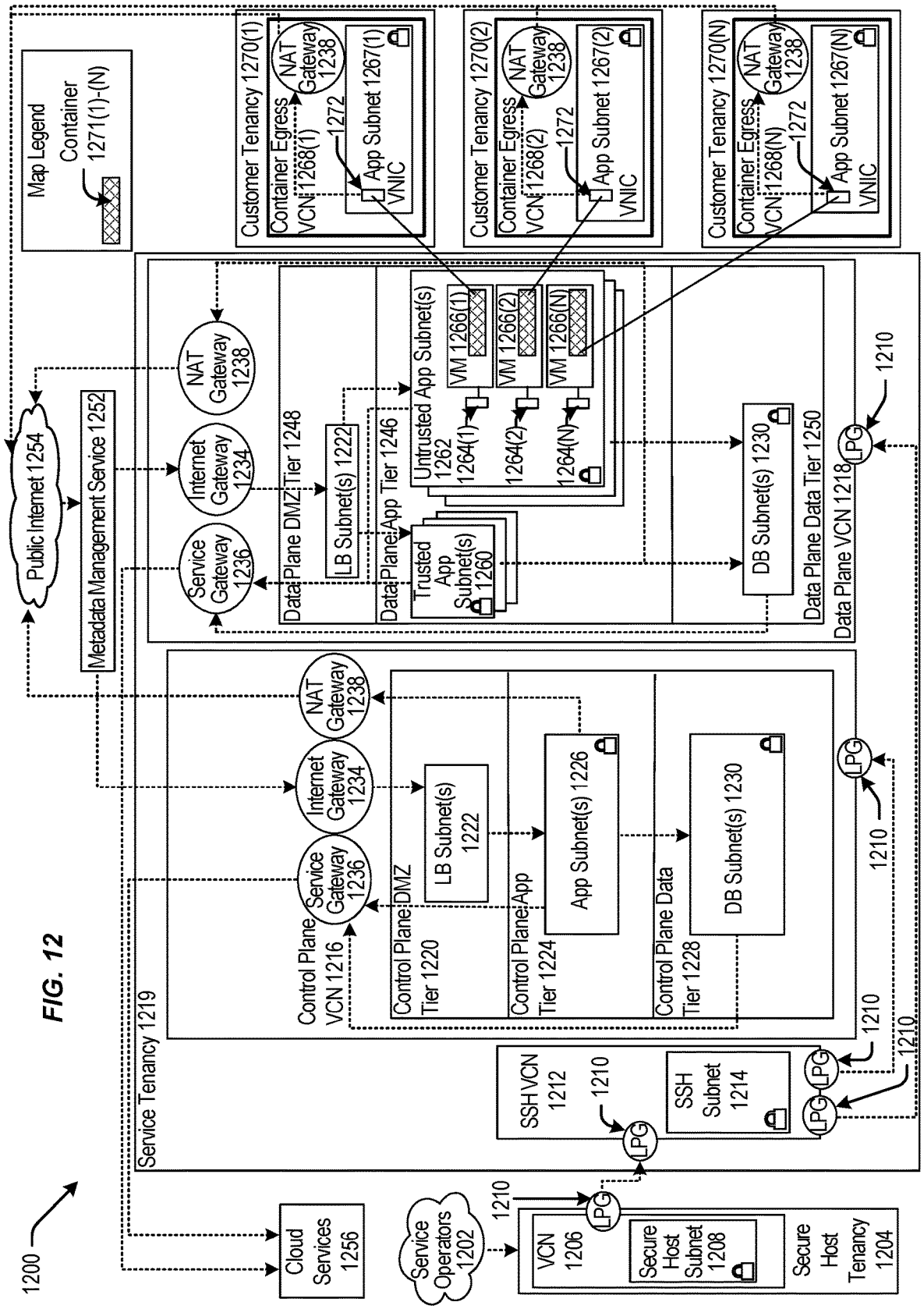
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 1002 of FIG. 10) can be communicatively coupled to a secure host tenancy 1204 (e.g. the secure host tenancy 1004 of FIG. 10) that can include a virtual cloud network (VCN) 1206 (e.g. the VCN 1006 of FIG. 10) and a secure host subnet 1208 (e.g. the secure host subnet 1008 of FIG. 10). The VCN 1206 can include an LPG 1210 (e.g. the LPG 1010 of FIG. 10) that can be communicatively coupled to an SSH VCN 1212 (e.g. the SSH VCN 1012 of FIG. 10) via an LPG 1210 contained in the SSH VCN 1212. The SSH VCN 1212 can include an SSH subnet 1214 (e.g. the SSH subnet 1014 of FIG. 10), and the SSH VCN 1212 can be communicatively coupled to a control plane VCN 1216 (e.g. the control plane VCN 1016 of FIG. 10) via an LPG 1210 contained in the control plane VCN 1216 and to a data plane VCN 1218 (e.g. the data plane 1018 of FIG. 10) via an LPG 1210 contained in the data plane VCN 1218. The control plane VCN 1216 and the data plane VCN 1218 can be contained in a service tenancy 1219 (e.g. the service tenancy 1019 of FIG. 10).

The control plane VCN 1216 can include a control plane DMZ tier 1220 (e.g. the control plane DMZ tier 1020 of FIG. 10) that can include load balancer (LB) subnet(s) 1222 (e.g. LB subnet(s) 1022 of FIG. 10), a control plane app tier 1224 (e.g. the control plane app tier 1024 of FIG. 10) that can include app subnet(s) 1226 (e.g. similar to app subnet(s) 1026 of FIG. 10), a control plane data tier 1228 (e.g. the control plane data tier 1028 of FIG. 10) that can include DB subnet(s) 1230. The LB subnet(s) 1222 contained in the control plane DMZ tier 1220 can be communicatively coupled to the app subnet(s) 1226 contained in the control plane app tier 1224 and to an Internet gateway 1234 (e.g. the Internet gateway 1034 of FIG. 10) that can be contained in the control plane VCN 1216, and the app subnet(s) 1226 can be communicatively coupled to the DB subnet(s) 1230 contained in the control plane data tier 1228 and to a service gateway 1236 (e.g. the service gateway of FIG. 10) and a network address translation (NAT) gateway 1238 (e.g. the NAT gateway 1038 of FIG. 10). The control plane VCN 1216 can include the service gateway 1236 and the NAT gateway 1238.

The data plane VCN 1218 can include a data plane app tier 1246 (e.g. the data plane app tier 1046 of FIG. 10), a data plane DMZ tier 1248 (e.g. the data plane DMZ tier 1048 of FIG. 10), and a data plane data tier 1250 (e.g. the data plane data tier 1050 of FIG. 10). The data plane DMZ tier 1248 can include LB subnet(s) 1222 that can be communicatively coupled to trusted app subnet(s) 1260 and untrusted app subnet(s) 1262 of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include one or more primary VNICs 1264(1)-(N) that can be communicatively coupled to tenant virtual machines (VMs) 1266(1)-(N). Each tenant VM 1266(1)-(N) can be communicatively coupled to a respective app subnet 1267(1)-(N) that can be contained in respective container egress VCNs 1268(1)-(N) that can be contained in respective customer tenancies 1270(1)-(N). Respective secondary VNICs 1272(1)-(N) can facilitate communication between the untrusted app subnet(s) 1262 contained in the data plane VCN 1218 and the app subnet contained in the container egress VCNs 1268(1)-(N). Each container egress VCNs 1268(1)-(N) can include a NAT gateway 1238 that can be communicatively coupled to public Internet 1254 (e.g. public Internet 1054 of FIG. 10).

The Internet gateway 1234 contained in the control plane VCN 1216 and contained in the data plane VCN 1218 can be communicatively coupled to a metadata management service 1252 (e.g. the metadata management system 1052 of FIG. 10) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some embodiments, the data plane VCN 1218 can be integrated with customer tenancies 1270. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1246. Code to run the function may be executed in the VMs 1266(1)-(N), and the code may not be configured to run anywhere else on the data plane VCN 1218. Each VM 1266(1)-(N) may be connected to one customer tenancy 1270. Respective containers 1271(1)-(N) contained in the VMs 1266(1)-(N) may be configured to run the code. In this case, there can be a dual isolation (e.g., the containers 1271(1)-(N) running code, where the containers 1271(1)-(N) may be contained in at least the VM 1266(1)-(N) that are contained in the untrusted app subnet(s) 1262), which may help prevent incorrect or otherwise undesirable code from damaging the network of the IaaS provider or from damaging a network of a different customer. The containers 1271(1)-(N) may be communicatively coupled to the customer tenancy 1270 and may be configured to transmit or receive data from the customer tenancy 1270. The containers 1271(1)-(N) may not be configured to transmit or receive data from any other entity in the data plane VCN 1218. Upon completion of running the code, the IaaS provider may kill or otherwise dispose of the containers 1271(1)-(N).

In some embodiments, the trusted app subnet(s) 1260 may run code that may be owned or operated by the IaaS provider. In this embodiment, the trusted app subnet(s) 1260 may be communicatively coupled to the DB subnet(s) 1230 and be configured to execute CRUD operations in the DB subnet(s) 1230. The untrusted app subnet(s) 1262 may be communicatively coupled to the DB subnet(s) 1230, but in this embodiment, the untrusted app subnet(s) may be configured to execute read operations in the DB subnet(s) 1230. The containers 1271(1)-(N) that can be contained in the VM 1266(1)-(N) of each customer and that may run code from the customer may not be communicatively coupled with the DB subnet(s) 1230.

In other embodiments, the control plane VCN 1216 and the data plane VCN 1218 may not be directly communicatively coupled. In this embodiment, there may be no direct communication between the control plane VCN 1216 and the data plane VCN 1218. However, communication can occur indirectly through at least one method. An LPG 1210 may be established by the IaaS provider that can facilitate communication between the control plane VCN 1216 and the data plane VCN 1218. In another example, the control plane VCN 1216 or the data plane VCN 1218 can make a call to cloud services 1256 via the service gateway 1236. For example, a call to cloud services 1256 from the control plane VCN 1216 can include a request for a service that can communicate with the data plane VCN 1218.

Figure 13:
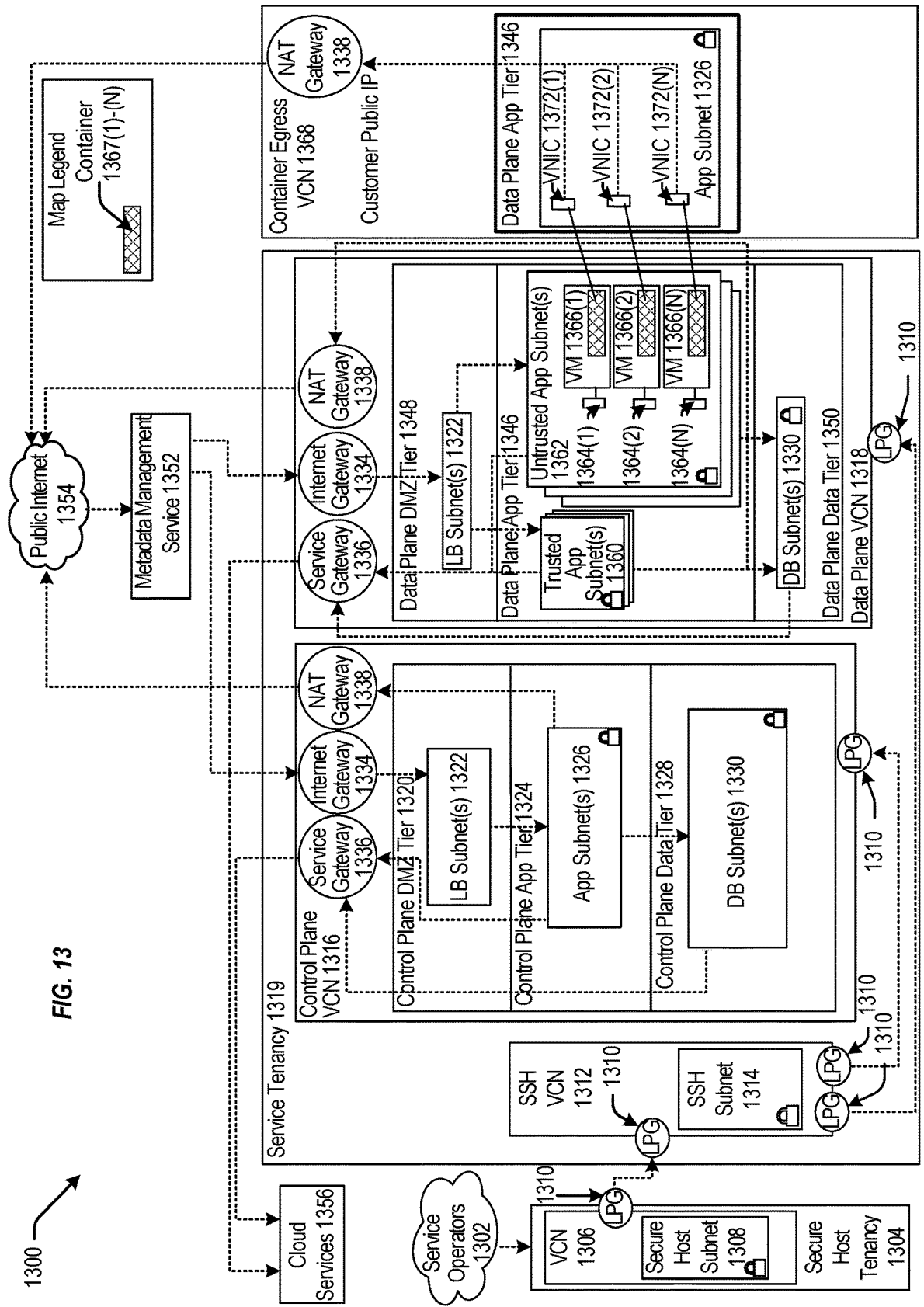
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1002 of FIG. 10) can be communicatively coupled to a secure host tenancy 1304 (e.g. the secure host tenancy 1004 of FIG. 10) that can include a virtual cloud network (VCN) 1306 (e.g. the VCN 1006 of FIG. 10) and a secure host subnet 1308 (e.g. the secure host subnet 1008 of FIG. 10). The VCN 1306 can include an LPG 1310 (e.g. the LPG 1010 of FIG. 10) that can be communicatively coupled to an SSH VCN 1312 (e.g. the SSH VCN 1012 of FIG. 10) via an LPG 1310 contained in the SSH VCN 1312. The SSH VCN 1312 can include an SSH subnet 1314 (e.g. the SSH subnet 1014 of FIG. 10), and the SSH VCN 1312 can be communicatively coupled to a control plane VCN 1316 (e.g. the control plane VCN 1016 of FIG. 10) via an LPG 1310 contained in the control plane VCN 1316 and to a data plane VCN 1318 (e.g. the data plane 1018 of FIG. 10) via an LPG 1310 contained in the data plane VCN 1318. The control plane VCN 1316 and the data plane VCN 1318 can be contained in a service tenancy 1319 (e.g. the service tenancy 1019 of FIG. 10).

The control plane VCN 1316 can include a control plane DMZ tier 1320 (e.g. the control plane DMZ tier 1020 of FIG. 10) that can include LB subnet(s) 1322 (e.g. LB subnet(s) 1022 of FIG. 10), a control plane app tier 1324 (e.g. the control plane app tier 1024 of FIG. 10) that can include app subnet(s) 1326 (e.g. app subnet(s) 1026 of FIG. 10), a control plane data tier 1328 (e.g. the control plane data tier 1028 of FIG. 10) that can include DB subnet(s) 1330 (e.g. DB subnet(s) 1230 of FIG. 12). The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1034 of FIG. 10) that can be contained in the control plane VCN 1316, and the app subnet(s) 1326 can be communicatively coupled to the DB subnet(s) 1330 contained in the control plane data tier 1328 and to a service gateway 1336 (e.g. the service gateway of FIG. 10) and a network address translation (NAT) gateway 1338 (e.g. the NAT gateway 1038 of FIG. 10). The control plane VCN 1316 can include the service gateway 1336 and the NAT gateway 1338.

The data plane VCN 1318 can include a data plane app tier 1346 (e.g. the data plane app tier 1046 of FIG. 10), a data plane DMZ tier 1348 (e.g. the data plane DMZ tier 1048 of FIG. 10), and a data plane data tier 1350 (e.g. the data plane data tier 1050 of FIG. 10). The data plane DMZ tier 1348 can include LB subnet(s) 1322 that can be communicatively coupled to trusted app subnet(s) 1360 (e.g. trusted app subnet(s) 1260 of FIG. 12) and untrusted app subnet(s) 1362 (e.g. untrusted app subnet(s) 1262 of FIG. 12) of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include primary VNICs 1364(1)-(N) that can be communicatively coupled to tenant virtual machines (VMs) 1366(1)-(N) residing within the untrusted app subnet(s) 1362. Each tenant VM 1366(1)-(N) can run code in a respective container 1367(1)-(N), and be communicatively coupled to an app subnet 1326 that can be contained in a data plane app tier 1346 that can be contained in a container egress VCN 1368. Respective secondary VNICs 1372(1)-(N) can facilitate communication between the untrusted app subnet(s) 1362 contained in the data plane VCN 1318 and the app subnet contained in the container egress VCN 1368. The container egress VCN can include a NAT gateway 1338 that can be communicatively coupled to public Internet 1354 (e.g. public Internet 1054 of FIG. 10).

The Internet gateway 1334 contained in the control plane VCN 1316 and contained in the data plane VCN 1318 can be communicatively coupled to a metadata management service 1352 (e.g. the metadata management system 1052 of FIG. 10) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some examples, the pattern illustrated by the architecture of block diagram 1300 of FIG. 13 may be considered an exception to the pattern illustrated by the architecture of block diagram 1200 of FIG. 12 and may be desirable for a customer of the IaaS provider if the IaaS provider cannot directly communicate with the customer (e.g., a disconnected region). The respective containers 1367(1)-(N) that are contained in the VMs 1366(1)-(N) for each customer can be accessed in real-time by the customer. The containers 1367(1)-(N) may be configured to make calls to respective secondary VNICs 1372(1)-(N) contained in app subnet(s) 1326 of the data plane app tier 1346 that can be contained in the container egress VCN 1368. The secondary VNICs 1372(1)-(N) can transmit the calls to the NAT gateway 1338 that may transmit the calls to public Internet 1354. In this example, the containers 1367(1)-(N) that can be accessed in real-time by the customer can be isolated from the control plane VCN 1316 and can be isolated from other entities contained in the data plane VCN 1318. The containers 1367(1)-(N) may also be isolated from resources from other customers.

In other examples, the customer can use the containers 1367(1)-(N) to call cloud services 1356. In this example, the customer may run code in the containers 1367(1)-(N) that requests a service from cloud services 1356. The containers 1367(1)-(N) can transmit this request to the secondary VNICs 1372(1)-(N) that can transmit the request to the NAT gateway that can transmit the request to public Internet 1354. Public Internet 1354 can transmit the request to LB subnet(s) 1322 contained in the control plane VCN 1316 via the Internet gateway 1334. In response to determining the request is valid, the LB subnet(s) can transmit the request to app subnet(s) 1326 that can transmit the request to cloud services 1356 via the service gateway 1336.

It should be appreciated that IaaS architectures 1000, 1100, 1200, 1300 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 14:
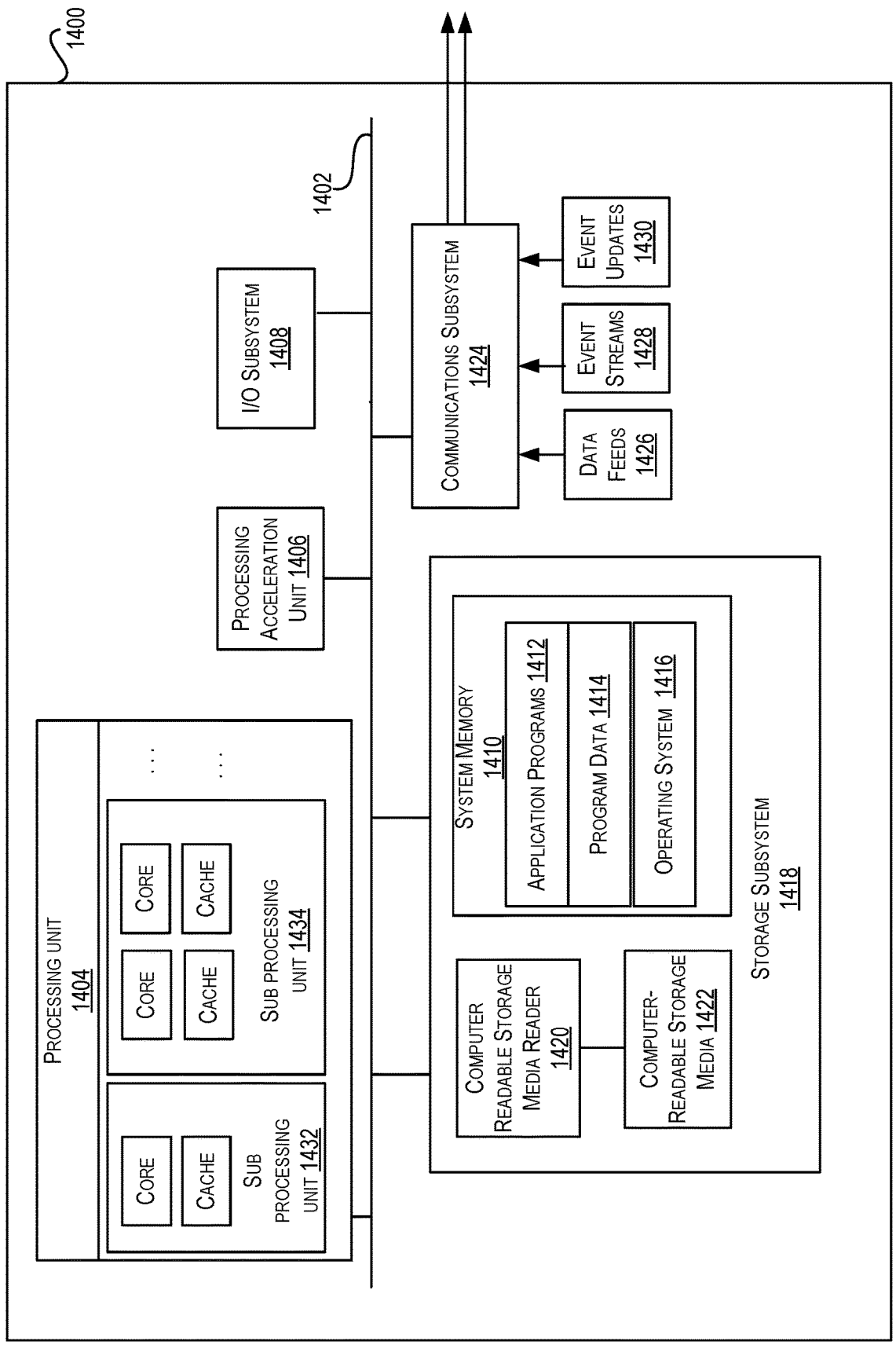
FIG. 14 is a block diagram illustrating an example computer system, according to at least one embodiment.

FIG. 14 illustrates an example computer system 1400, in which various embodiments of the present disclosure may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that comprises software elements, shown as being currently located within a system memory 1410. System memory 1410 may store program instructions that are loadable and executable on processing unit 1404, as well as data generated during the execution of these programs.

Depending on the configuration and type of computer system 1400, system memory 1410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 may include multiple different types of memory, such as static random access memory (SRAM) or dynamic random access memory (DRAM). In some implementations, a basic input/output system (BIOS), containing the basic routines that help to transfer information between elements within computer system 1400, such as during start-up, may typically be stored in the ROM. By way of example, and not limitation, system memory 1410 also illustrates application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 14 OS, and Palm® OS operating systems.

Storage subsystem 1418 may also provide a tangible computer-readable storage medium for storing the basic programming and data constructs that provide the functionality of some embodiments. Software (programs, code modules, instructions) that when executed by a processor provide the functionality described above may be stored in storage subsystem 1418. These software modules or instructions may be executed by processing unit 1404. Storage subsystem 1418 may also provide a repository for storing data used in accordance with the present disclosure.

Storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1400.

By way of example, computer-readable storage media 1422 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The virtual or overlay networks can include one or more virtual cloud networks (VCNs). The virtual networks are implemented using software virtualization technologies (e.g., hypervisors, functions performed by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual networks. Both the physical IP addresses and overlay IP addresses are types of real IP addresses. These are separate from virtual IP addresses, where a virtual IP address maps to multiple real IP addresses. A virtual IP address provides a 1-to-many mapping between the virtual IP address and multiple real IP addresses.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in an virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions.

A customer may create one or more VCNs using resources hosted by CSPI. A compute instance deployed on a customer VCN may communicate with different endpoints. These endpoints can include endpoints that are hosted by CSPI and endpoints outside CSPI.

Figure 15:
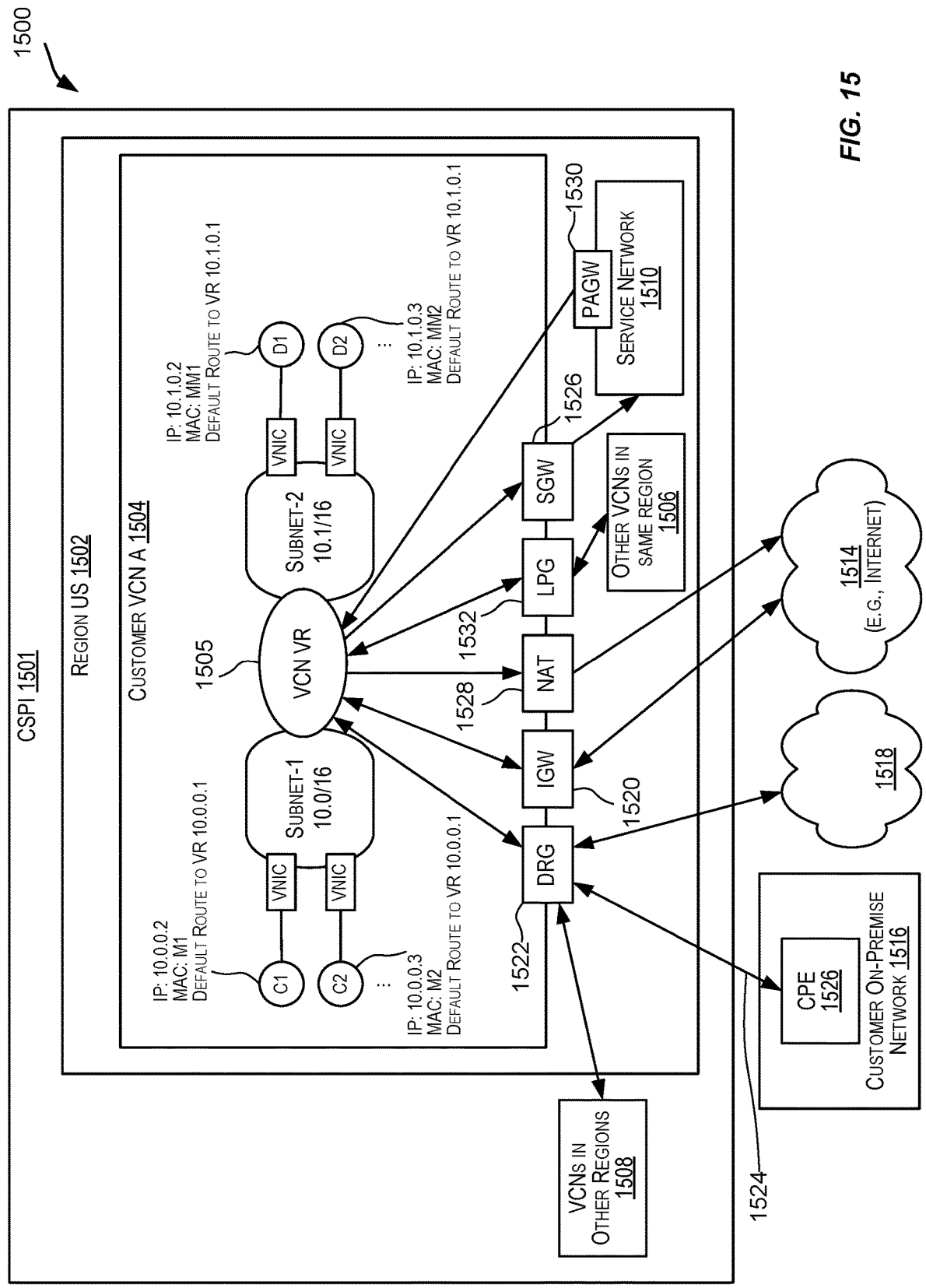
FIG. 15 is a high level diagram of a distributed environment showing a virtual or overlay cloud network hosted by a cloud service provider infrastructure according to certain embodiments.

Various different architectures for implementing cloud-based service using CSPI are depicted in FIGS. 15, 16, 17, 18, and 19, and are described below. FIG. 15 is a high level diagram of a distributed environment 1500 showing an overlay or customer VCN hosted by CSPI according to certain embodiments. The distributed environment depicted in FIG. 15 includes multiple components in the overlay network. Distributed environment 1500 depicted in FIG. 15 is merely an example and is not intended to unduly limit the scope of claimed embodiments. Many variations, alternatives, and modifications are possible. For example, in some implementations, the distributed environment depicted in FIG. 15 may have more or fewer systems or components than those shown in FIG. 1, may combine two or more systems, or may have a different configuration or arrangement of systems.

As shown in the example depicted in FIG. 15, distributed environment 1500 comprises CSPI 1501 that provides services and resources that customers can subscribe to and use to build their virtual cloud networks (VCNs). In certain embodiments, CSPI 1501 offers IaaS services to subscribing customers. The data centers within CSPI 1501 may be organized into one or more regions. One example region "Region US" 1502 is shown in FIG. 15. A customer has configured a customer VCN 1504 for region 1502. The customer may deploy various compute instances on VCN 1504, where the compute instances may include virtual machines or bare metal instances. Examples of instances include applications, database, load balancers, and the like.

In the embodiment depicted in FIG. 15, customer VCN 1504 comprises two subnets, namely, "Subnet-1" and "Subnet-2", each subnet with its own CIDR IP address range. In FIG. 15, the overlay IP address range for Subnet-1 is 10.0/16 and the address range for Subnet-2 is 10.1/16. A VCN Virtual Router 1505 represents a logical gateway for the VCN that enables communications between subnets of the VCN 1504, and with other endpoints outside the VCN. VCN VR 1505 is configured to route traffic between VNICs in VCN 1504 and gateways associated with VCN 1504. VCN VR 1505 provides a port for each subnet of VCN 1504. For example, VR 1505 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 1501. A compute instance participates in a subnet via a VNIC associated with the compute instance. For example, as shown in FIG. 15, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 15, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 1505 using IP address 10.0.0.1, which is the IP address for a port of VCN VR 1505 for Subnet-1.

Subnet-2 can have multiple compute instances deployed on it, including virtual machine instances and/or bare metal instances. For example, as shown in FIG. 15, compute instances D1 and D2 are part of Subnet-2 via VNICs associated with the respective compute instances. In the embodiment depicted in FIG. 15, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 1505 using IP address 10.1.0.1, which is the IP address for a port of VCN VR 1505 for Subnet-2.

VCN A 1504 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 1504 can communicate with various different endpoints. These endpoints may include endpoints that are hosted by CSPI 1600 and endpoints outside CSPI 1600. Endpoints that are hosted by CSPI 1501 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 1506 or 1510, communications between a compute instance in Subnet-1 and an endpoint in service network 1510 in the same region); or an endpoint in a VCN in a different region (e.g., communications between a compute instance in Subnet-1 and an endpoint in a VCN in a different region 1508). A compute instance in a subnet hosted by CSPI 1501 may also communicate with endpoints that are not hosted by CSPI 1501 (i.e., are outside CSPI 1501). These outside endpoints include endpoints in the customer's on-premise network 1516, endpoints within other remote cloud hosted networks 1518, public endpoints 1514 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 15 wants to send a packet to compute instance D1 in Subnet-2, the packet is first processed by the VNIC associated with compute instance C1. The VNIC associated with compute instance C1 is configured to route the packet to the VCN VR 1505 using default route or port 10.0.0.1 of the VCN VR. VCN VR 1505 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 1504 to an endpoint that is outside VCN 1504, the communication is facilitated by the VNIC associated with the source compute instance, VCN VR 1505, and gateways associated with VCN 1504. One or more types of gateways may be associated with VCN 1504. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 1504. The packet may be first processed by the VNIC associated with source compute instance C1. The VNIC processing determines that the destination for the packet is outside the Subnet-1 of C1. The VNIC associated with C1 may forward the packet to VCN VR 1505 for VCN 1504. VCN VR 1505 then processes the packet and as part of the processing, based upon the destination for the packet, determines a particular gateway associated with VCN 1504 as the next hop for the packet. VCN VR 1505 may then forward the packet to the particular identified gateway. For example, if the destination is an endpoint within the customer's on-premise network, then the packet may be forwarded by VCN VR 1505 to Dynamic Routing Gateway (DRG) gateway 1522 configured for VCN 1504. The packet may then be forwarded from the gateway to a next hop to facilitate communication of the packet to it final intended destination.

Various different types of gateways may be configured for a VCN. Examples of gateways that may be configured for a VCN are depicted in FIG. 15 and described below. As shown in the embodiment depicted in FIG. 15, a Dynamic Routing Gateway (DRG) 1522 may be added to or be associated with customer VCN 1504 and provides a path for private network traffic communication between customer VCN 1504 and another endpoint, where the another endpoint can be the customer's on-premise network 1516, a VCN 1508 in a different region of CSPI 1501, or other remote cloud networks 1518 not hosted by CSPI 1501. Customer on-premise network 1516 may be a customer network or a customer data center built using the customer's resources. Access to customer on-premise network 1516 is generally very restricted. For a customer that has both a customer on-premise network 1516 and one or more VCNs 1504 deployed or hosted in the cloud by CSPI 1501, the customer may want their on-premise network 1516 and their cloud-based VCN 1504 to be able to communicate with each other. This enables a customer to build an extended hybrid environment encompassing the customer's VCN 1504 hosted by CSPI 1501 and their on-premises network 1516. DRG 1522 enables this communication. To enable such communications, a communication channel 1524 is set up where one endpoint of the channel is in customer on-premise network 1516 and the other endpoint is in CSPI 1501 and connected to customer VCN 1504. Communication channel 1524 can be over public communication networks such as the Internet or private communication networks. Various different communication protocols may be used such as IPsec VPN technology over a public communication network such as the Internet, Oracle's FastConnect technology that uses a private network instead of a public network, and others. The device or equipment in customer on-premise network 1516 that forms one end point for communication channel 1524 is referred to as the customer premise equipment (CPE), such as CPE 1526 depicted in FIG. 15. On the CSPI 1501 side, the endpoint may be a host machine executing DRG 1522.

In certain embodiments, a Remote Peering Connection (RPC) can be added to a DRG, which allows a customer to peer one VCN with another VCN in a different region. Using such an RPC, customer VCN 1504 can use DRG 1522 to connect with a VCN 1508 in another region. DRG 1522 may also be used to communicate with other remote cloud networks 1518, not hosted by CSPI 1501 such as a Microsoft Azure cloud, Amazon AWS cloud, and others.

As shown in FIG. 15, an Internet Gateway (IGW) 1520 may be configured for customer VCN 1504 the enables a compute instance on VCN 1504 to communicate with public endpoints 1514 accessible over a public network such as the Internet. IGW 15120 is a gateway that connects a VCN to a public network such as the Internet. IGW 1520 enables a public subnet (where the resources in the public subnet have public overlay IP addresses) within a VCN, such as VCN 1504, direct access to public endpoints 1512 on a public network 1514 such as the Internet. Using IGW 1520, connections can be initiated from a subnet within VCN 1504 or from the Internet.

A Network Address Translation (NAT) gateway 1528 can be configured for customer's VCN 1504 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 1504, with private access to public endpoints on the Internet. In NAT gateways, connections can be initiated only from the private subnet to the public Internet and not from the Internet to the private subnet.

In certain embodiments, a Service Gateway (SGW) 1526 can be configured for customer VCN 1504 and provides a path for private network traffic between VCN 1504 and supported services endpoints in a service network 1510. In certain embodiments, service network 1510 may be provided by the CSP and may provide various services. An example of such a service network is Oracle's Services Network, which provides various services that can be used by customers. For example, a compute instance (e.g., a database system) in a private subnet of customer VCN 1504 can back up data to a service endpoint (e.g., Object Storage) without needing public IP addresses or access to the Internet. In certain embodiments, a VCN can have only one SGW, and connections can only be initiated from a subnet within the VCN and not from service network 1510. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 1526 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 1532 is a gateway that can be added to customer VCN 1504 and enables VCN 1504 to peer with another VCN in the same region. Peering means that the VCNs communicate using private IP addresses, without the traffic traversing a public network such as the Internet or without routing the traffic through the customer's on-premises network 1516. In preferred embodiments, a VCN has a separate LPG for each peering it establishes. Local Peering or VCN Peering is a common practice used to establish network connectivity between different applications or infrastructure management functions.

Service providers, such as providers of services in service network 1510, may provide access to services using different access models. According to a public access model, services may be exposed as public endpoints that are publicly accessible by compute instance in a customer VCN via a public network such as the Internet and or may be privately accessible via SGW 1526. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 1530 is a gateway resource that can be attached to a service provider VCN (e.g., a VCN in service network 1510) that acts as an ingress/egress point for all traffic from/to customer subnet private endpoints. PAGW 1530 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 1530 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 1532 and the PE in the customer's VCN.

A customer can control routing in a VCN at the subnet level, so the customer can specify which subnets in the customer's VCN, such as VCN 1504, use each gateway. A VCN's route tables are used to decide if traffic is allowed out of a VCN through a particular gateway. For example, in a particular instance, a route table for a public subnet within customer VCN 1504 may send non-local traffic through IGW 1520. The route table for a private subnet within the same customer VCN 1504 may send traffic destined for CSP services through SGW 1526. All remaining traffic may be sent via the NAT gateway 1528. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 1504) can be categorized as public access, private access, or dedicated access. Public access refers to an access model where a public IP address or a NAT is used to access a public endpoint. Private access enables customer workloads in VCN 1504 with private IP addresses (e.g., resources in a private subnet) to access services without traversing a public network such as the Internet. In certain embodiments, CSPI 1501 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 16:
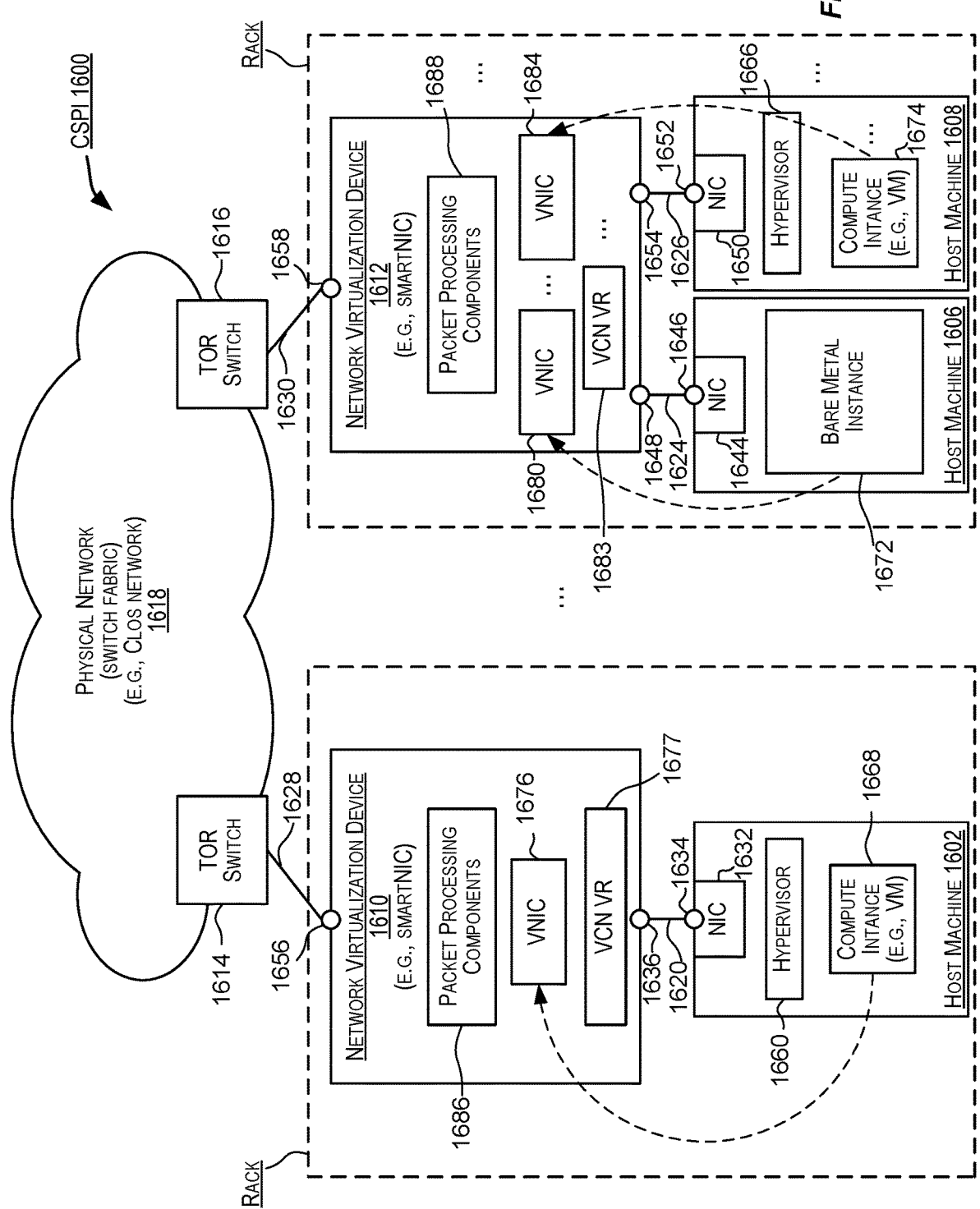
FIG. 16 depicts a simplified architectural diagram of the physical components in the physical network within CSPI according to certain embodiments.

FIG. 15 and the accompanying description above describes various virtualized components in an example virtual network. As described above, the virtual network is built on the underlying physical or substrate network. FIG. 16 depicts a simplified architectural diagram of the physical components in the physical network within CSPI 1600 that provide the underlay for the virtual network according to certain embodiments. As shown, CSPI 1600 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 1600 are provisioned for the customer. Customers can then build their own cloud-based (i.e., CSPI-hosted) customizable and private virtual networks using physical compute, memory, and networking resources provided by CSPI 1600. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 1600 provides infrastructure and a set of complementary cloud services that enable customers to build and run a wide range of applications and services in a highly available hosted environment.

In the example embodiment depicted in FIG. 16, the physical components of CSPI 1600 include one or more physical host machines or physical servers (e.g., 1602, 1606, 1608), network virtualization devices (NVDs) (e.g., 1610, 1612), top-of-rack (TOR) switches (e.g., 1614, 1616), and a physical network (e.g., 1618), and switches in physical network 1618. The physical host machines or servers may host and execute various compute instances that participate in one or more subnets of a VCN. The compute instances may include virtual machine instances, and bare metal instances. For example, the various compute instances depicted in FIG. 15 may be hosted by the physical host machines depicted in FIG. 16. The virtual machine compute instances in a VCN may be executed by one host machine or by multiple different host machines. The physical host machines may also host virtual host machines, container-based hosts or functions, and the like. The VNICs and VCN VR depicted in FIG. 15 may be executed by the NVDs depicted in FIG. 16. The gateways depicted in FIG. 15 may be executed by the host machines and/or by the NVDs depicted in FIG. 16.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 16, host machines 1602 and 1608 execute hypervisors 1660 and 1666, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 16, hypervisor 1660 may sit on top of the OS of host machine 1602 and enables the computing resources (e.g., processing, memory, and networking resources) of host machine 1602 to be shared between compute instances (e.g., virtual machines) executed by host machine 1602. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 16 may have the same or different types of hypervisors.

A compute instance can be a virtual machine instance or a bare metal instance. In FIG. 16, compute instances 1668 on host machine 1602 and 1674 on host machine 1608 are examples of virtual machine instances. Host machine 1606 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 16, host machine 1602 executes a virtual machine compute instance 1668 that is associated with VNIC 1676, and VNIC 1676 is executed by NVD 1610 connected to host machine 1602. As another example, bare metal instance 1672 hosted by host machine 1606 is associated with VNIC 1680 that is executed by NVD 1612 connected to host machine 1606. As yet another example, VNIC 1684 is associated with compute instance 1674 executed by host machine 1608, and VNIC 1684 is executed by NVD 1612 connected to host machine 1608.

For compute instances hosted by a host machine, an NVD connected to that host machine also executes VCN VRs corresponding to VCNs of which the compute instances are members. For example, in the embodiment depicted in FIG. 16, NVD 1610 executes VCN VR 1677 corresponding to the VCN of which compute instance 1668 is a member. NVD 1612 may also execute one or more VCN VRs 1683 corresponding to VCNs corresponding to the compute instances hosted by host machines 1606 and 1608.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 16, host machine 1602 is connected to NVD 1610 using link 1620 that extends between a port 1634 provided by a NIC 1632 of host machine 1602 and between a port 1636 of NVD 1610. Host machine 1606 is connected to NVD 1612 using link 1624 that extends between a port 1646 provided by a NIC 1644 of host machine 1606 and between a port 1648 of NVD 1612. Host machine 1608 is connected to NVD 1612 using link 1626 that extends between a port 1652 provided by a NIC 1650 of host machine 1608 and between a port 1654 of NVD 1612.

The NVDs are in turn connected via communication links to top-of-the-rack (TOR) switches, which are connected to physical network 1618 (also referred to as the switch fabric). In certain embodiments, the links between a host machine and an NVD, and between an NVD and a TOR switch are Ethernet links. For example, in FIG. 16, NVDs 1610 and 1612 are connected to TOR switches 1614 and 1616, respectively, using links 1628 and 1630. In certain embodiments, the links 1620, 1624, 1626, 1628, and 1630 are Ethernet links. The collection of host machines and NVDs that are connected to a TOR is sometimes referred to as a rack.

Figure 19:
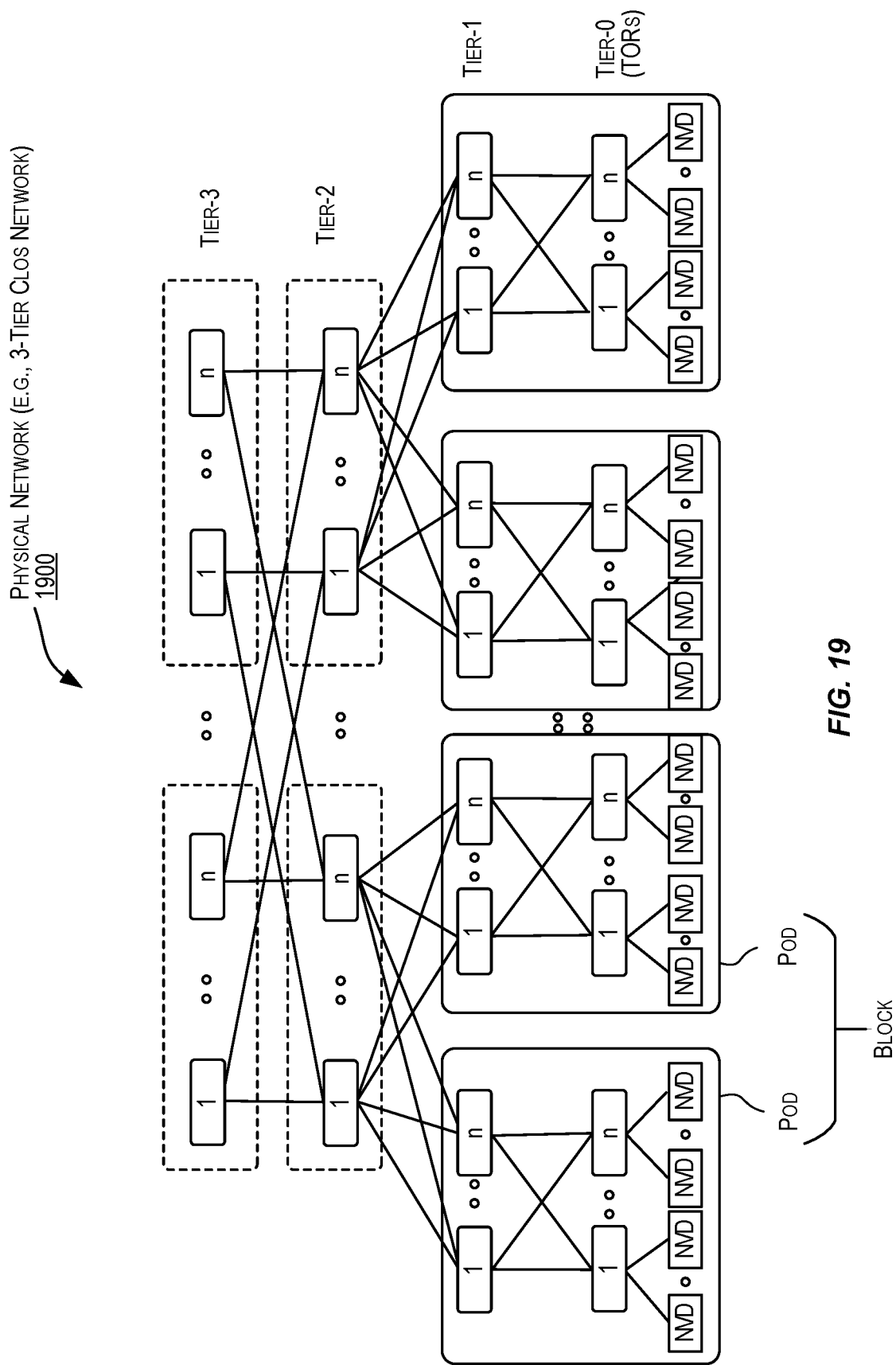
FIG. 19 depicts a simplified block diagram of a physical network provided by a CSPI according to certain embodiments.

Physical network 1618 provides a communication fabric that enables TOR switches to communicate with each other. Physical network 1618 can be a multi-tiered network. In certain implementations, physical network 1618 is a multi-tiered Clos network of switches, with TOR switches 1614 and 1616 representing the leaf level nodes of the multi-tiered and multi-node physical switching network 1618. Different Clos network configurations are possible including but not limited to a 2-tier network, a 3-tier network, a 4-tier network, a 5-tier network, and in general a "n"-tiered network. An example of a Clos network is depicted in FIG. 19 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 16, host machine 1602 is connected to NVD 1610 via NIC 1632 of host machine 1602. In a many-to-one configuration, multiple host machines are connected to one NVD. For example, in FIG. 16, host machines 1606 and 1608 are connected to the same NVD 1612 via NICs 1644 and 1650, respectively.

Figure 17:
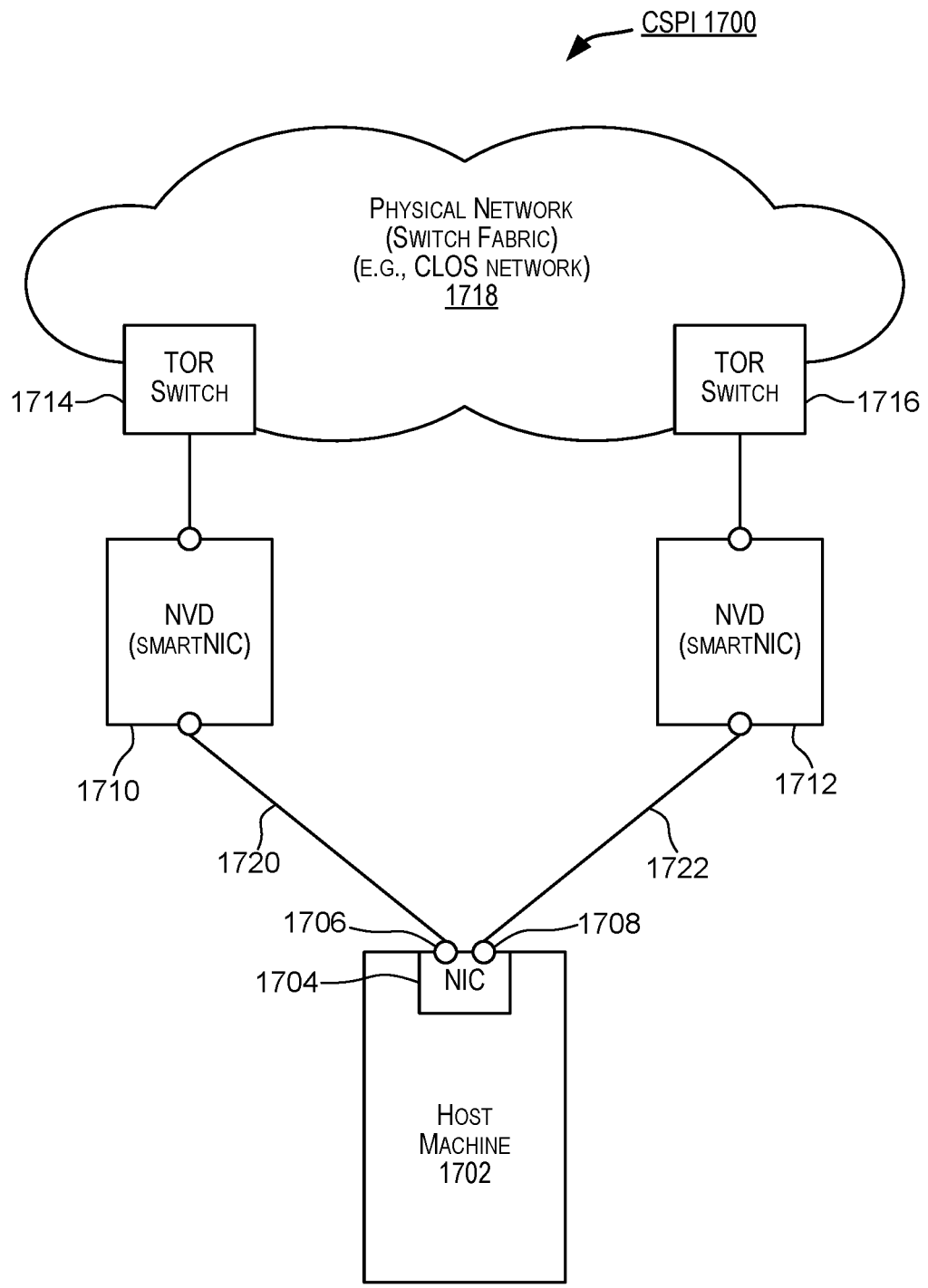
FIG. 17 shows an example arrangement within CSPI where a host machine is connected to multiple network virtualization devices (NVDs) according to certain embodiments.

In a one-to-many configuration, one host machine is connected to multiple NVDs. FIG. 17 shows an example within CSPI 1700 where a host machine is connected to multiple NVDs. As shown in FIG. 17, host machine 1702 comprises a network interface card (NIC) 1704 that includes multiple ports 1706 and 1708. Host machine 1700 is connected to a first NVD 1710 via port 1706 and link 1720, and connected to a second NVD 1712 via port 1708 and link 1722. Ports 1706 and 1708 may be Ethernet ports and the links 1720 and 1722 between host machine 1702 and NVDs 1710 and 1712 may be Ethernet links. NVD 1710 is in turn connected to a first TOR switch 1714 and NVD 1712 is connected to a second TOR switch 1716. The links between NVDs 1710 and 1712, and TOR switches 1714 and 1716 may be Ethernet links. TOR switches 1714 and 1716 represent the Tier-0 switching devices in multi-tiered physical network 1718.

The arrangement depicted in FIG. 17 provides two separate physical network paths to and from physical switch network 1718 to host machine 1702: a first path traversing TOR switch 1714 to NVD 1710 to host machine 1702, and a second path traversing TOR switch 1716 to NVD 1712 to host machine 1702. The separate paths provide for enhanced availability (referred to as high availability) of host machine 1702. If there are problems in one of the paths (e.g., a link in one of the paths goes down) or devices (e.g., a particular NVD is not functioning), then the other path may be used for communications to/from host machine 1702.

In the configuration depicted in FIG. 17, the host machine is connected to two different NVDs using two different ports provided by a NIC of the host machine. In other embodiments, a host machine may include multiple NICs that enable connectivity of the host machine to multiple NVDs.

Referring back to FIG. 16, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 16, the NVDs 1610 and 1612 may be implemented as smartNICs that are connected to host machines 1602, and host machines 1606 and 1608, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 1600. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 16, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 16 include port 1636 on NVD 1610, and ports 1648 and 1654 on NVD 1612. A network-facing port of an NVD is a port that is used to connect the NVD to a TOR switch. Examples of network-facing ports in FIG. 16 include port 1656 on NVD 1610, and port 1658 on NVD 1612. As shown in FIG. 16, NVD 1610 is connected to TOR switch 1614 using link 1628 that extends from port 1656 of NVD 1610 to the TOR switch 1614. Likewise, NVD 1612 is connected to TOR switch 1616 using link 1630 that extends from port 1658 of NVD 1612 to the TOR switch 1616.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with cis in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 16, NVD 1610 executes the functionality for VNIC 1676 that is associated with compute instance 1668 hosted by host machine 1602 connected to NVD 1610. As another example, NVD 1612 executes VNIC 1680 that is associated with bare metal compute instance 1672 hosted by host machine 1606, and executes VNIC 1684 that is associated with compute instance 1674 hosted by host machine 1608. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 16, NVD 1610 executes VCN VR 1677 corresponding to the VCN to which compute instance 1668 belongs. NVD 1612 executes one or more VCN VRs 1683 corresponding to one or more VCNs to which compute instances hosted by host machines 1606 and 1608 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 16. For example, NVD 1610 comprises packet processing components 1686 and NVD 1612 comprises packet processing components 1688. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 15 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 15 may be executed or hosted by one or more of the physical components depicted in FIG. 16. For example, the compute instances in a VCN may be executed or hosted by one or more host machines depicted in FIG. 16. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 16, a packet originating from compute instance 1668 may be communicated from host machine 1602 to NVD 1610 over link 1620 (using NIC 1632). On NVD 1610, VNIC 1676 is invoked since it is the VNIC associated with source compute instance 1668. VNIC 1676 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 1600 and endpoints outside CSPI 1600. Endpoints hosted by CSPI 1600 may include instances in the same VCN or other VCNs, which may be the customer's VCNs, or VCNs not belonging to the customer. Communications between endpoints hosted by CSPI 1600 may be performed over physical network 1618. A compute instance may also communicate with endpoints that are not hosted by CSPI 1600, or are outside CSPI 1600. Examples of these endpoints include endpoints within a customer's on-premise network or data center, or public endpoints accessible over a public network such as the Internet. Communications with endpoints outside CSPI 1600 may be performed over public networks (e.g., the Internet) (not shown in FIG. 16) or private networks (not shown in FIG. 16) using various communication protocols.

The architecture of CSPI 1600 depicted in FIG. 16 is merely an example and is not intended to be limiting. Variations, alternatives, and modifications are possible in alternative embodiments. For example, in some implementations, CSPI 1600 may have more or fewer systems or components than those shown in FIG. 16, may combine two or more systems, or may have a different configuration or arrangement of systems. The systems, subsystems, and other components depicted in FIG. 16 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 18:
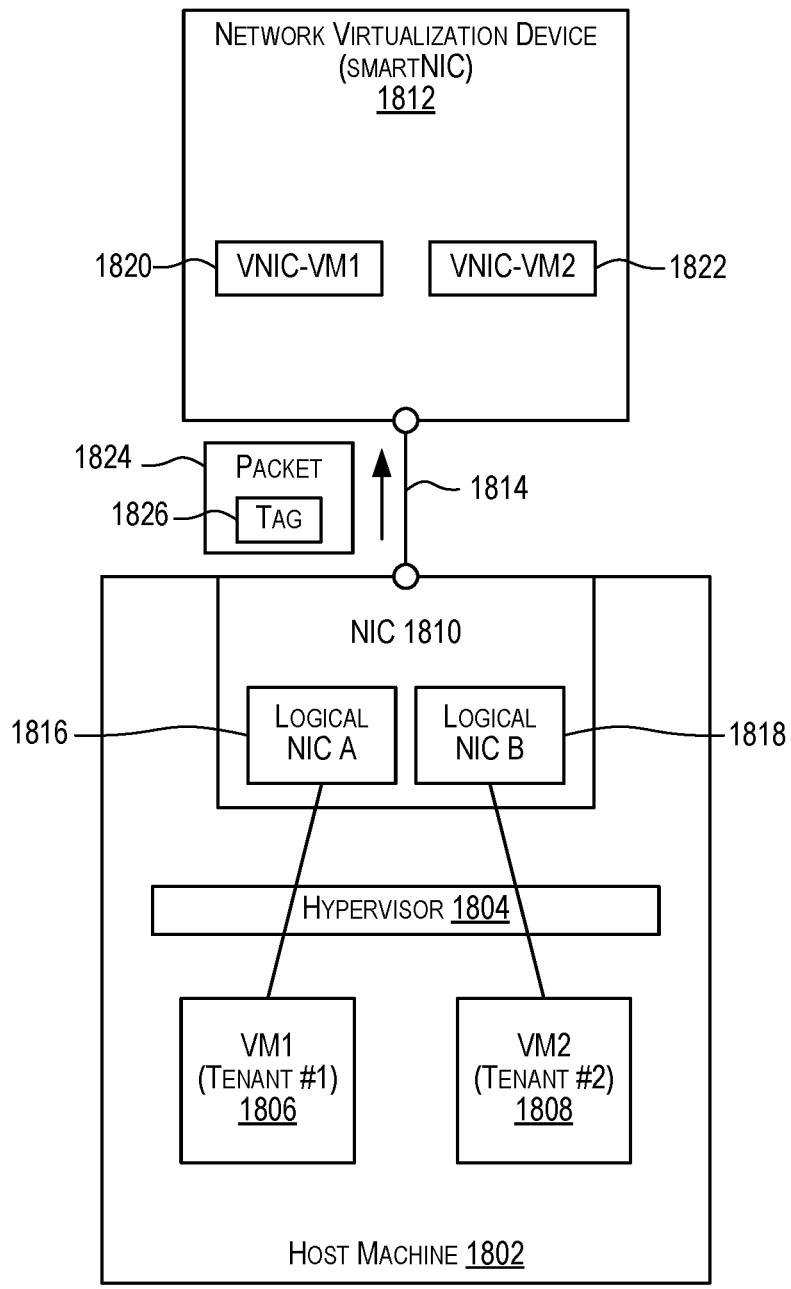
FIG. 18 depicts connectivity between a host machine and an NVD for providing I/O virtualization for supporting multitenancy according to certain embodiments.

FIG. 18 depicts connectivity between a host machine and an NVD for providing I/O virtualization for supporting multitenancy according to certain embodiments. As depicted in FIG. 18, host machine 1802 executes a hypervisor 1804 that provides a virtualized environment. Host machine 1802 executes two virtual machine instances, VM1 1806 belonging to customer/tenant #1 and VM2 1808 belonging to customer/tenant #2. Host machine 1802 comprises a physical NIC 1810 that is connected to an NVD 1812 via link 1814. Each of the compute instances is attached to a VNIC that is executed by NVD 1812. In the embodiment in FIG. 18, VM1 1806 is attached to VNIC-VM1 1820 and VM2 1808 is attached to VNIC-VM2 1822.

As shown in FIG. 18, NIC 1810 comprises two logical NICs, logical NIC A 1816 and logical NIC B 1818. Each virtual machine is attached to and configured to work with its own logical NIC. For example, VM1 1806 is attached to logical NIC A 1816 and VM2 1808 is attached to logical NIC B 1818. Even though host machine 1802 comprises only one physical NIC 1810 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 1816 for Tenant #1 and a separate VLAN ID is assigned to logical NIC B 1818 for Tenant #2. When a packet is communicated from VM1 1806, a tag assigned to Tenant #1 is attached to the packet by the hypervisor and the packet is then communicated from host machine 1802 to NVD 1812 over link 1814. In a similar manner, when a packet is communicated from VM2 1808, a tag assigned to Tenant #2 is attached to the packet by the hypervisor and the packet is then communicated from host machine 1802 to NVD 1812 over link 1814. Accordingly, a packet 1824 communicated from host machine 1802 to NVD 1812 has an associated tag 1826 that identifies a specific tenant and associated VM. On the NVD, for a packet 1824 received from host machine 1802, the tag 1826 associated with the packet is used to determine whether the packet is to be processed by VNIC-VM1 1820 or by VNIC-VM2 1822. The packet is then processed by the corresponding VNIC. The configuration depicted in FIG. 18 enables each tenant's compute instance to believe that they own their own host machine and NIC. The setup depicted in FIG. 18 provides for I/O virtualization for supporting multi-tenancy.

FIG. 19 depicts a simplified block diagram of a physical network 1900 according to certain embodiments. The embodiment depicted in FIG. 19 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 19 is a 3-tiered network comprising tiers 1, 2, and 3. The TOR switches 1904 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 19, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 1900 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION] [.FUTURE USE].<UNIQUE ID> where,
  ocid1: The literal string indicating the version of the CID;
  resource type: The type of resource (for example, instance, volume, VCN, subnet, user, group, and so on);
  realm: The realm the resource is in. Example values are "c1" for the commercial realm, "c2" for the Government Cloud realm, or "c3" for the Federal Government Cloud realm, etc. Each realm may have its own domain name;

region: The region the resource is in. If the region is not applicable to the resource, this part might be blank;

future use: Reserved for future use.

unique ID: The unique portion of the ID. The format may vary depending on the type of resource or service.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A system comprising:
   a network headend device comprising memory and providing an endpoint for a secured transmission link located within a virtual cloud network ("VCN"), wherein the network headend device is configured to:
   receive a first key provisioned by a customer;
   receive a first data packet sent from a device of the customer; and
   decrypt the first data packet using the first key to obtain information; and
   a network virtualization device comprising memory, wherein the network virtualization device is configured to:
   receive the information from the network headend device;
   ascertain that the information is to be sent to a destination in the VCN;

generate a second data packet, wherein the second data packet comprises the information encrypted using a second key; and route the second data packet to the destination in the VCN.

2. The system of claim 1, wherein the system is maintained by a host, and the host does not have access to the first key or the second key.

3. The system of claim 1, wherein both the network headend device and the network virtualization device are comprised in a VCN gateway associated with the VCN.

4. The system of claim 3, wherein the VCN gateway comprises a processor.

5. The system of claim 3, wherein the VCN gateway comprises a first network card associated with the VCN headend and a second network card associated with the network virtualization device.

6. The system of claim 3, wherein the VCN gateway is dedicated to the customer.

7. The system of claim 3, wherein the VCN headend and the network virtualization device share at least one of: a network card; a rack; or a room.

8. The system of claim 3, wherein the VCN gateway is configured to terminate an Internet Protocol SECurity (IPSec) tunnel.

9. The system of claim 1, wherein the network headend device is configured to be a termination point of an internet protocol security (IPSec) tunnel formed between the network headend device and a customer device.

10. The system of claim 1, wherein the first data packet is routed through the public Internet.

11. The system of claim 1, wherein the first data packet is routed through a set of private links, without using links in the public Internet.

12. The system of claim 1, wherein the destination in the VCN comprises a virtual machine.

13. The system of claim 12, wherein the network virtualization device supports the virtual machine in the virtual cloud network.

14. The system of claim 1, wherein the network headend device is dedicated to the customer, such that no other customers of a host use the network headend device.

15. The system of claim 1, wherein the network headend device is a first network headend device and the system further comprises a second network headend device configured to decrypt data from the customer.

16. The system of claim 1, wherein:
the network virtualization device is a first network virtualization device;
the virtual cloud network is a first virtual cloud network;
the system further comprises a second network virtualization device; and
the second network virtualization device is configured to receive data from the network headend device and encrypt data received from the network headend device for a second virtual cloud network using a third key.

17. The system of claim 16, wherein the first network virtualization device and the second network virtualization device are part of the same network interface card.

18. A method comprising:
receiving, using a network headend device, a first key provisioned by a customer, the network headend device providing an endpoint for a secure transmission link within a virtual cloud network ("VCN");
receiving a first data packet at the network headend device sent from a device of the customer;
decrypting the first data packet, using the first key, to obtain information;
receiving, using a network virtualization device, the information from the network headend device;
ascertaining that the information is to be sent to a destination in the VCN;
generate a second data packet, wherein the second data packet comprises the information encrypted using a second key; and
routing the second data packet to the destination in the VCN.

19. A non-transitory computer-readable memory storing a plurality of instructions executable by one or more processors, the plurality of instructions comprising instructions that when executed by the one or more processors cause the one or more processors to perform processing comprising:
receiving, using a network headend device, a first key provisioned by a customer, the network headend device providing an endpoint for a secure transmission link within a virtual cloud network ("VCN");
receiving a first data packet at the network headend device sent from a device of the customer;
decrypting the first data packet, using the first key, to obtain information;
receiving, using a network virtualization device, the information from the network headend device;
ascertaining that the information is to be sent to a destination in the VCN;
generate a second data packet, wherein the second data packet comprises the information encrypted using a second key; and
routing the second data packet to the destination in the VCN.

* * * * *